США006342880B2

United States Patent
Rosenberg et al.

(10) Patent No.: US 6,342,880 B2
(45) Date of Patent: *Jan. 29, 2002

(54) FORCE FEEDBACK SYSTEM INCLUDING MULTIPLE FORCE PROCESSORS

(75) Inventors: Louis B. Rosenberg, Pleasanton; Christopher J. Hasser, Newark; Bruce M. Schena, Menlo Park; Mike D. Levin, Sunnyvale, all of CA (US)

(73) Assignee: Immersion Corporation, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/414,294

(22) Filed: Oct. 6, 1999

Related U.S. Application Data

(63) Continuation of application No. 08/804,535, filed on Feb. 21, 1997, now Pat. No. 5,999,168, which is a continuation-in-part of application No. 08/534,791, filed on Sep. 27, 1995, now Pat. No. 5,739,811.

(51) Int. Cl.[7] .............................. G09G 5/08; G09G 5/00
(52) U.S. Cl. ..................... 345/161; 345/163; 345/167; 345/168; 345/156; 463/30; 463/37; 463/38
(58) Field of Search .................... 345/156, 157, 345/161, 163, 167, 168; 463/30, 37, 38

(56) References Cited

U.S. PATENT DOCUMENTS 3,919,691 A  11/1975  Noll .................. 340/172.5
4,148,014 A  4/1979  Burson .................. 340/709

(List continued on next page.)

FOREIGN PATENT DOCUMENTS

EP  0085518   8/1983
EP  0626634 A2  11/1994

(List continued on next page.)

OTHER PUBLICATIONS

Kelley, A.J., et al., "MagicMouse: Tactile and Kinesthetic Feedback in the Human–Computer Interface using an Electromagnetically Actuated Input/Output Device," Dept. of Electrical Eng., Univ. of British Columbia, Oct. 1993, pp. 1–27.

(List continued on next page.)

Primary Examiner—Bipin Shalwala
Assistant Examiner—Jimmy H. Nguyen
(74) Attorney, Agent, or Firm—James R. Riegel

(57) ABSTRACT

A force feedback interface including a haptic accelerator that relieves the computational burden associated with force feedback generation from a force feedback processor. The force feedback processor is preferably a device microprocessor included in the interface device and separate from a controlling host computer for determining forces to be output. The haptic accelerator quickly determines velocity and/or acceleration information describing motion of a user manipulatable object from raw position data received from sensors of the interface device and representing the position of the user object. The velocity and/or acceleration data is used by the force feedback processor in the determination of forces to be output on the user object. The haptic accelerator can in some embodiments also quickly and reliably determine condition forces which depend on the motion of the user object, thus relieving additional computation burden from the force feedback processor and permitting the force feedback processor to focus on determining other types of forces and overseeing the operation of the force feedback interface device.

15 Claims, 15 Drawing Sheets

U.S. PATENT DOCUMENTS

| | | | | |
|---|---|---|---|---|
| 4,398,889 | A | 8/1983 | Lam et al. | 434/45 |
| 4,436,188 | A | 3/1984 | Jones | 188/378 |
| 4,477,043 | A | 10/1984 | Repperger | 244/223 |
| 4,560,983 | A | 12/1985 | Williams | 340/825 |
| 4,601,206 | A | 7/1986 | Watson | 73/514 |
| 4,639,884 | A | 1/1987 | Sagues | 364/565 |
| 4,769,763 | A | 9/1988 | Trieb et al. | 364/559 |
| 4,787,051 | A | 11/1988 | Olson | 364/518 |
| 4,795,296 | A * | 1/1989 | Jau | 414/5 |
| 4,800,721 | A | 1/1989 | Cemenska et al. | 60/393 |
| 4,868,549 | A | 9/1989 | Affinito et al. | 340/710 |
| 4,896,554 | A | 1/1990 | Culver | 74/471 XY |
| 4,897,582 | A | 1/1990 | Otten et al. | 318/135 |
| 4,907,970 | A | 3/1990 | Meenen, Jr. | 434/45 |
| 4,925,312 | A | 5/1990 | Onaga et al. | 364/513 |
| 4,933,584 | A | 6/1990 | Harms et al. | 310/162 |
| 4,949,119 | A | 8/1990 | Moncrief et al. | 364/578 |
| 4,961,038 | A | 10/1990 | MacMinn | 318/696 |
| 4,961,138 | A | 10/1990 | Gorniak | 364/200 |
| 5,007,085 | A | 4/1991 | Greanias et al. | 380/25 |
| 5,044,956 | A | 9/1991 | Behensky et al. | 434/45 |
| 5,072,361 | A | 12/1991 | Davis et al. | 364/167.01 |
| 5,103,404 | A | 4/1992 | McIntosh | 318/568.22 |
| 5,107,080 | A | 4/1992 | Rosen | 200/6 |
| 5,116,051 | A | 5/1992 | Moncrief et al. | 273/448 B |
| 5,116,180 | A | 5/1992 | Fung et al. | 414/5 |
| 5,142,931 | A | 9/1992 | Menahem | 74/471 XY |
| 5,143,505 | A | 9/1992 | Burdea et al. | 414/5 |
| 5,146,566 | A | 9/1992 | Hollis, Jr. et al. | 395/275 |
| 5,181,181 | A | 1/1993 | Glynn | 364/566 |
| 5,184,319 | A | 2/1993 | Kramer | 364/806 |
| 5,185,561 | A | 2/1993 | Good et al. | 318/432 |
| 5,186,629 | A | 2/1993 | Rohen | 434/114 |
| 5,193,963 | A | 3/1993 | McAffee et al. | 414/5 |
| 5,197,003 | A | 3/1993 | Moncrief et al. | 364/424 |
| 5,220,260 | A | 6/1993 | Schuler | 318/561 |
| 5,223,776 | A | 6/1993 | Radke et al. | 318/568.1 |
| 5,228,356 | A | 7/1993 | Chuang | 74/471 XY |
| 5,243,266 | A | 9/1993 | Kasagami et al. | 318/568.1 |
| 5,264,768 | A | 11/1993 | Gregory et al. | 318/561 |
| 5,286,203 | A | 2/1994 | Fuller et al. | 434/45 |
| 5,327,790 | A | 7/1994 | Levin et al. | 73/862.325 |
| 5,381,080 | A | 1/1995 | Schnell et al. | 318/566 |
| 5,384,460 | A | 1/1995 | Tseng | 250/231.14 |
| 5,389,865 | A | 2/1995 | Jacobus et al. | 318/568.11 |
| 5,396,266 | A | 3/1995 | Brimhall | 345/161 |
| 5,396,267 | A | 3/1995 | Bouton | 345/168 |
| 5,402,582 | A | 4/1995 | Raab | 33/503 |
| 5,405,152 | A | 4/1995 | Katanics et al. | 273/438 |
| 5,414,337 | A | 5/1995 | Schuler | 318/561 |
| 5,428,748 | A | 6/1995 | Davidson et al. | 395/275 |
| 5,429,140 | A | 7/1995 | Burdea et al. | 128/774 |
| 5,451,924 | A | 9/1995 | Massimino et al. | 340/407.1 |
| 5,482,051 | A | 1/1996 | Reddy et al. | 128/733 |
| 5,512,919 | A | 4/1996 | Araki | 345/156 |
| 5,513,100 | A | 4/1996 | Parker et al. | 364/167 |
| 5,570,111 | A | 10/1996 | Barrett et al. | 345/147 |
| 5,576,727 | A | 11/1996 | Rosenberg et al. | 345/179 |
| 5,577,581 | A | 11/1996 | Jarvik | 482/4 |
| 5,589,828 | A | 12/1996 | Armstrong | 341/20 |
| 5,589,854 | A * | 12/1996 | Tsai | 345/161 |
| 5,591,924 | A | 1/1997 | Hilton | 73/862.043 |
| 5,623,582 | A | 4/1997 | Rosenberg | 395/99 |
| 5,625,576 | A | 4/1997 | Massie et al. | 364/678 |
| 5,629,594 | A | 5/1997 | Jacobus et al. | 318/568 |
| 5,634,794 | A | 6/1997 | Hildreth et al. | 434/37 |
| 5,642,469 | A | 6/1997 | Hannaford et al. | 395/99 |
| 5,643,087 | A | 7/1997 | Marcus et al. | 463/38 |
| 5,666,138 | A | 9/1997 | Culver | 345/161 |
| 5,666,473 | A | 9/1997 | Wallace | 345/420 |
| 5,694,013 | A | 12/1997 | Stewart et al. | 318/561 |
| 5,701,140 | A | 12/1997 | Rosenberg et al. | 345/156 |
| 5,709,219 | A | 1/1998 | Chen et al. | 128/782 |
| 5,714,978 | A | 2/1998 | Yamanaka et al. | 345/157 |
| 5,721,566 | A | 2/1998 | Rosenberg et al. | 345/161 |
| 5,731,804 | A | 3/1998 | Rosenberg | 345/156 |
| 5,734,373 | A | 3/1998 | Rosenberg et al. | 345/161 |
| 5,740,083 | A | 4/1998 | Anderson et al. | 364/565 |
| 5,742,278 | A | 4/1998 | Chen | 345/156 |
| 5,767,839 | A | 6/1998 | Rosenberg | 345/161 |
| 5,781,172 | A | 7/1998 | Engel et al. | 345/164 |
| 5,790,108 | A | 8/1998 | Salcudean et al. | 345/184 |
| 5,802,353 | A | 9/1998 | Avila et al. | 395/500 |
| 5,805,140 | A | 9/1998 | Rosenberg et al. | 345/161 |
| 5,825,308 | A | 10/1998 | Rosenberg | 341/20 |
| 5,844,392 | A | 12/1998 | Peurach et al. | 318/568.17 |
| 5,889,672 | A | 3/1999 | Schuler et al. | 364/188 |
| 5,959,613 | A | 9/1999 | Rosenberg et al. | 345/161 |
| 5,990,869 | A | 11/1999 | Kubica et al. | 345/163 |
| 6,004,134 | A | 12/1999 | Marcus et al. | 434/45 |
| 6,005,551 | A | 12/1999 | Osborne et al. | 345/161 |
| 6,057,828 | A | 5/2000 | Rosenberg et al. | 345/156 |
| 6,104,158 | A | 8/2000 | Jacobus et al. | 318/568.11 |

FOREIGN PATENT DOCUMENTS

| | | |
|---|---|---|
| WO | WO9502801 | 1/1995 |
| WO | WO9520787 | 8/1995 |
| WO | WO9520788 | 8/1995 |
| WO | WO9532459 | 11/1995 |
| WO | WO9616397 | 5/1996 |

OTHER PUBLICATIONS

Jacobsen, S.C. et al., "High Performance, High Dexterity, Force Reflective Teleoperator II," ANS Topical Meeting on Robotics & Remote Systems, Albuquerque, New Mexico Feb. 24–27, 1991, pp. 1–10.

Buttolo, Pietro et al., "Pen–Based Force Display for Precision Manipulation in Virtual Environments," IEEE Mar. 1995, pp. 1–8.

Bejczy, Antal K., "The Phantom Robot: Predictive Displays for Teleoperation with Time Delay," IEEE 1990, pp. 546–550.

Ellis, R.E. et al., "Design and Evaluation of a High–Performance Prototype Planar Haptic Interface," ASME Dec. 3, 1993, DSC–vol. 49, pp. 55–64.

Colgate J. Edward et al., Implementation of Stiff Virtual Walls in Force–Reflecting Interfaces, Sep. 22, 1993.

Iwata, Hiroo et al, Volume Haptization, IEEE 1993, pp. 16–18.

Fischer, Patrick et al., "Specification and Design of Input Devices for Teleoperation," 1990.

Rosenberg, Louis B., "The Use of Virtual Fixtures as Perceptual Overlays to Enhance Operator Performance in Remote Environments," Air Force Material Command, Sep. 1992, pp. 1–42.

Rosenberg, Louis B., "The Use of Virtual Fixtures to Enhance Operator Performance in Time Delayed Teleoperation", Armstrong Laboratory, Mar. 1993, pp. 1–45.

Rosenberg, Louis B., "Perceptual Design of a Virtual Rigid Surface Contact," Center for Design Research Stanford University, Air Force Material Command, Apr. 1993, pp. 1–41.

Rosenberg, Louis B. et al., "Perceptual Decomposition of Virtual Haptic Surfaces," IEEE, Oct. 1993.

Rosenberg, Louis B., "Virtual Fixtures as Tools to Enhance Operator Performance in Telepresence Environments," SPIE Telemanipulator Technology, 1993.

Rosenberg, Louis B., "Virtual Haptic Overlays Enhance Performance in Telepresence Tasks," SPIE 1994.

Adelstein, Bernard D. et al., "Design and Implementation of a Force Reflecting Manipulandum for Manual Control Research," 1992, pp. 1–24.

Hannaford, Blake et al., "Performance Evaluation of a Six–Axis Generalized Force–Reflecting Teleoperator," IEEE May/Jun. 1991, vol. 21, No. 3, pp. 620–633.

Minsky, Margaret et al., "Feeling and Seeing: Issues in Force Display," ACM 1990, pp. 235–242.

Batter, James J. et al., "Grope–1: A Computer Display to the Sense of Feel," pp. TA–4–188–TA–4–192.

Gotow, J.K., et al., "Perception of Mechanical Properties at the Man–Machine Interface," IEEE 1987, pp. 688–689.

Atkinson, William D. et al., "Computing with Feeling," Comput. & Graphics, vol. 2, No. 2–E, pp. 97–103.

Ouh–Young, Ming, "Force Display in Molecular Docking," Chapel Hill 1990, pp. 1–85.

Wiker, Steven F. et al., "Development of Tactile Mice for Blind Access to Computers: Importance of Stimulation Locus, Object Size, and Vibrotactile Display Resolution," Proceedings of the Human Factors Society 35th Annual Meeting 1991, pp. 708–712.

Iwata, Hiroo, "Pen–based Haptic Virtual Environment," Institute of Engineering Mechanics, University of Tsukuba, Japan, pp. 287–292.*

Howe, Robert D., "Task Performance with a Dextrous Teleoperated Hand System," Proceedings of SPIE, Nov. 1992, vol. 1833, pp. 1–9.*

Schmult, Brian et al., "Application Areas for a Force–Feedback Joystick," ASME 1993, DSC–vol. 49, pp. 47–54.*

Hasser, Christopher John, "Tactile Feedback for a Force–Reflecting Haptic Display," The School of Engineering, University of Dayton, Dec. 1995, pp. iii–xii & 1–96.

Russo, Massimo Andrea, "The Design and Implementation of a Three Degree–of–Freedom Force Output Joystick," Department of Mechanical Engineering, May 11, 1990, pp. 9–40 & 96 & 97.

Kilpatrick, Paul Jerome, "The Use of a Kinesthetic Supplement in an Interactive Graphics System", University of North Carolina at Chapel Hill, 1976.

Winey III, Calvin Mccoy, "Computer Simulated Visual and Tactile Feedback as an Aid to Manipulator and Vehicle Control," MIT, Jun. 1981.

Rosenberg, L.B., "Commercially Viable Force Feedback Controller for Individuals with Neuromotor Disabilities", AL/CF–TR–1997–0016, United States Air Force Armstrong Laboratory, May 1996, pp. 1–33.

Rosenberg et al., "Using Force Feedback to Enhance Human Performance in Graphical User Interfaces", Apr. 1996, www.acm.org.

Yokokohji, Y., et al, "What You Can See is What You Can Feel—Development of a Visual/Haptic Interface to Virtual Environment", Proceedings of VRAIS, 1996, pp. 46–53.

Klafter, R.D. et al., "Robotic Engineering: An Integrated Approach," Prentice–Hall, Englewood Cliffs, NJ, 1989, pp. 360–369.

Bhatti, P. et al., "Single Chip Velocity Measurement System for Incremental Optical Encoders", IEEE Trnas. on Control Systems Technology, 11/97, pp. 1–30.

Ohmae, T. et al., "A Microprocessor–Controlled High–Accuracy Wide–Range Speed Regulator for Motor Drives," IEEE Trans. On Industrial Electronics, vol. IE–29, No. 3, Aug. 1982, pp. 207–211.

Lemkin, M. et al., "Velocity Estimation From Widely Spaced Encoder Pulses," American Control Conference, Seattle, Washington, Jun. 1996, pp. 998–1002.

Brown, R. H. et al., "Velocity Observations from Discrete Prosition Encoders," Proc. IECON '87, $13^{th}$ Annual IEEE Industrial Electronics Soc. Conf., Boston, MA, Nov. 1987, pp. 1111–1118.

Brown, R.H. et al., "Analysis of Algorithms for Velocity Estimation from Discrete Position versus Time Data," IEEE Trans. on Insustrial Electronics, vol. 39, No. 1, Feb. 1992, pp. 11–19.

Saito, K. et al., "A Microprocessor–Controlled Speed Regulator with Instantaneous Speed Estimation for Motor Drives," IEEE Trans. On Industrial Electronics, vol. 35, No. 1, Feb. 1988, pp. 95–99.

Helmers, Carl, "Robotics Age: In the Beginning", Hayden Book Company, Hasbrouck Heights, NJ, 1983, pp. 12–19.

SMCC–STD bus Two Axis Smart Motion Control Card, Delta Tau Data Systems, Inc., 1992.

Kelley, A. J. et al., "On the Development of a Force–Feedback Mouse and Its Integration into a Graphical User Interface," Symp. on Haptic Interfaces for Virtual Environment and Teleoperator Systems, 1994 Int'l Mech. Engineering Congress and Exhibition, 1994.

Hirota, K. et al., "Development of Surface Display," IEEE 0–7803–1363–1/93, 1993, pp. 256–262.

Bostrom et al., "Design of An Interactive Lumbar Puncture Simulator With Tactile Feedback," IEEE 0–7803–1363, 1993, pp. 280–286.

Hirota et al., "Development of Surface Display," IEEE 0–7803–1363, 1993, pp. 256–262.

* cited by examiner

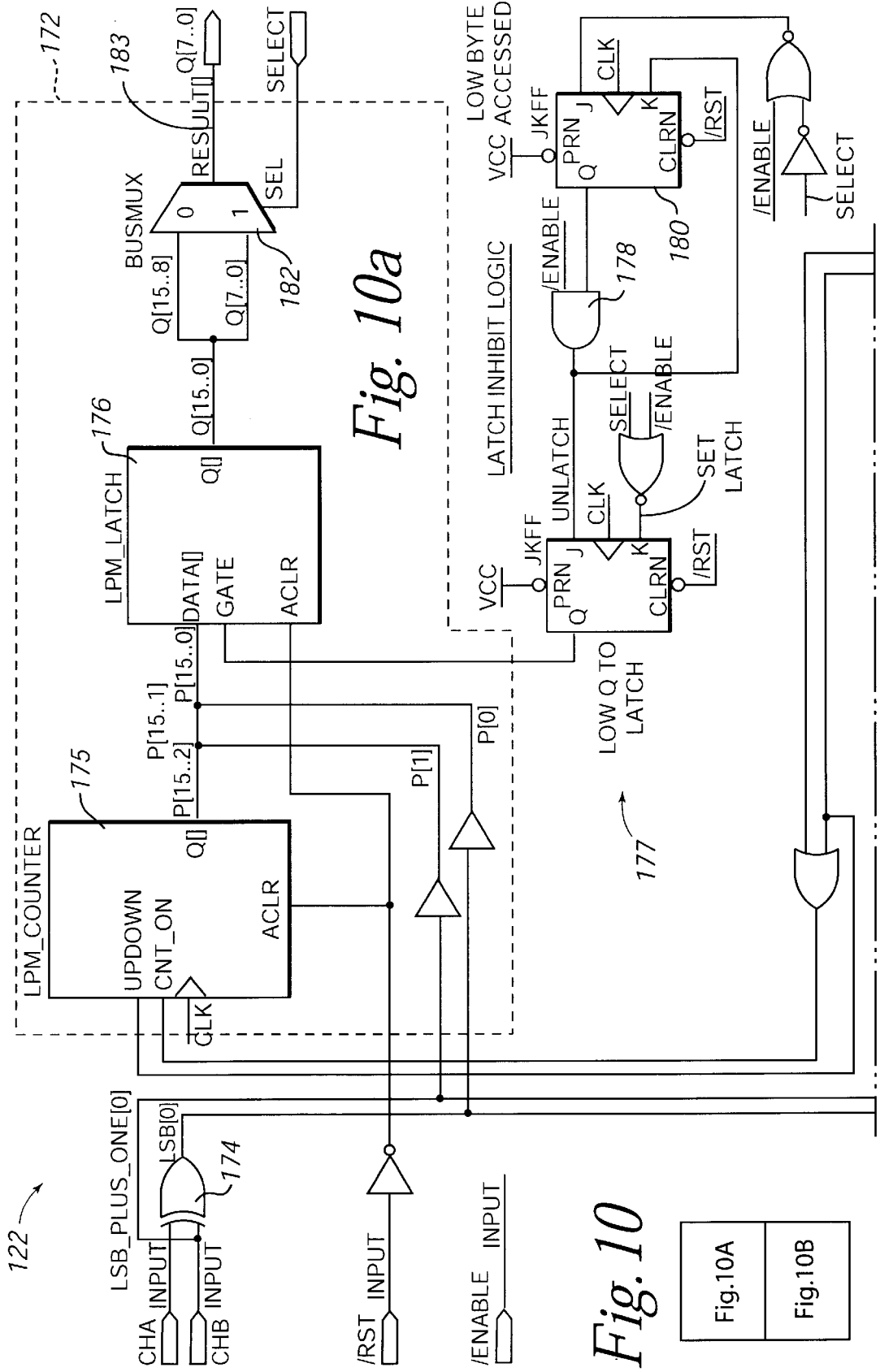

FORCE FEEDBACK SYSTEM INCLUDING MULTIPLE FORCE PROCESSORS

CROSS REFERENCE TO RELATED APPLICATIONS

This is a request for filing a continuation application under 37 C.F.R. § 1.53(b)(1) of prior application U.S. Ser. No. 08/804,535, now U.S. Pat. No. 5,999,168, filed on Feb. 21, 1997 in the name of Louis B. Rosenberg et al., which is a continuation-in-part of application No. 08/534,791, now U.S. Pat. No. 5,739,811, filed Sep. 27, 1995, and from which priority under 35 U.S.C. § 120 is claimed.

BACKGROUND OF THE INVENTION

The present invention relates generally to interface devices for allowing humans to interface with computer systems, and more particularly to computer interface devices that allow the user to provide input to computer systems and provide force feedback to the user.

Computer systems are used extensively in many different industries to implement computer controlled applications and tasks, and are also very popular with the mass market of home consumers. A computer system typically displays a visual environment to a user on a display screen or other visual output device. Users can interact with the displayed environment to perform functions and tasks on the computer, such as playing a game, experiencing a simulation or virtual reality environment, using a computer aided design system, operating a graphical user interface (GUI), performing file manipulation, or otherwise influencing events or images depicted on the screen. Such user interaction can be implemented through the use of a human-computer interface device, such as a joystick, mouse, trackball, stylus, tablet, pressure-sensitive ball, or the like, that is connected to the computer system controlling the displayed environment. Typically, the computer updates the environment in response to the user's manipulation of a user-manipulatable physical object such as a joystick or mouse, and provides feedback to the user utilizing the display screen and, typically, audio speakers. The computer senses the user's manipulation of the object through sensors provided on the interface device.

In some interface devices, tactile and/or haptic feedback is also provided to the user, more generally known as "force feedback." These types of interface devices can provide physical sensations to the user manipulating a user manipulable object of the interface device. For example, the Force-FX controller from CH Products, Inc. and Immersion Corporation may be connected to a computer and provides forces to a user of the controller. Typically, motors or other actuators are coupled to the user object and are connected to the controlling computer system. The computer system can provide forces on the object in conjunction with application program events by sending control signals to the actuators. The computer system can thus convey physical force sensations to the user in conjunction with other supplied feedback as the user is grasping or contacting the object of the interface device.

In most of the prior art force feedback interface devices, the host computer directly controls forces output by the actuators of the interface device, i.e., a host computer closes a control loop around the system to generate sensations and maintain stability through direct host control. FIG. 1 illustrates a block diagram of a control system 10 having a typical host controlled loop architecture. A user manipulated object 12, such as a joystick, of an interface device 13 is moved by a user to interface with a host computer 14 having a host CPU (or microprocessor) 16, memory 17, a display device 18, and I/O circuitry 19. Sensors 20 detect the position of the user object in provided degrees of freedom and buttons or other controls may also be provided to detect user actions. The sensor data including position data is sent to host computer 14 over a bi-directional communication bus 21 that is typically connected to an interface card 22 plugged into the host computer. To complete the control loop, host computer 14 sends force commands over bus 20 to actuators 24, and the actuators output forces to the user via user object 12.

The configuration of FIG. 1 has disadvantages in the inexpensive mass market, since the functions of reading sensor data and outputting force values to actuators 24 can be a computational burden on the host processor which detracts from the performance of the host in other host tasks and application program execution. In addition, low bandwidth interfaces 22 are often used in mass market computer systems, which reduces the ability of the host computer to control realistic forces requiring high frequency signals.

Some prior art force feedback devices employ a more sophisticated computational architecture having a dedicated microprocessor local to the interface device that communicates with the host computer through a high-level command language. As shown in FIG. 2, a local microprocessor 26 reads sensors and control actuators in response to commands from the host computer. The local microprocessor reports data and creates force feedback sensations as a result of parsing host commands. Such an architecture is disclosed, for example, in issued U.S. Pat. No. 5,576,727, and is used in the abovementioned Force-FX joystick from CH Products and Immersion Corp. The advantage of this architecture is that the local microprocessor can reduce the computational burden on the host computer associated with generating force feedback sensations. This is particularly important for "closed loop" force feedback sensations such as simulated springs, dampers, and inertias which are generated as a function of motion of the user manipulatable object as reported by the sensors. These "closed loop" sensations, referred to herein as "condition forces" or "conditions" are computationally intensive because sensors must be read and actuators must be controlled in a very rapid control loop. Such a loop of reading sensors, performing computations on sensor data, and controlling actuators must be performed on the order of 1000 times per second to achieve high fidelity force feedback functionality. Having a local microprocessor perform these closed loop condition forces in response to high level commands from the host computer allows the host application to maintain control over the sensations without being burdened with actually performing the rapid control loops. This enables the use of force feedback with host applications such that the performance of the host application is not significantly degraded when implementing force feedback functionality.

While the above dual-processor architecture is a significant improvement over traditional force feedback architectures, cost constraints on the local microprocessor limit the speed/performance of that processor and thus limit the fidelity of local "closed loop" force sensations. There is a need to develop low-cost methods of reducing the computational burden of the local microprocessor associated with high-fidelity closed loop "conditions" such as springs, dampers, and inertias. This is because low-cost local microprocessors lack the processing speed to perform the force feedback computations of closed-loop conditions while at the same time perform other tasks such as controlling communication with the host computer, decoding commands, reporting sensor data, and creating "open loop" force feedback "effects," such as jolts, vibrations, etc. The local microprocessor, however, must be kept low-cost and simple to manufacture for mass market force feedback interface devices so that the interface device is competitively priced in the high volume, aggressive home computer and home video game markets.

SUMMARY OF THE INVENTION

The present invention is directed to a new computer architecture for use in a force feedback interface device that further distributes the computational burden associated with force feedback generation by providing a haptic accelerator chip. The accelerator chip performs support functionality so as to relieve the computational burden on the local microprocessor of the interface device and increase performance and fidelity of forces at a low cost.

More specifically, the force feedback interface device is used with a host computer which displays and updates an application program such as a graphical simulation on a display device in response to user manipulation of the interface device. The host computer commands force feedback sensations in response to the user manipulation and in coordination with events within the graphical simulation. The interface device includes a user manipulatable object graspable by the user, such as a mouse or a joystick, an actuator for outputting a force on the user manipulatable object, and a sensor for outputting a raw sensor signal indicative of a position of the user manipulatable object. A force feedback processor determines output force commands for commanding forces to be applied on the user object by the actuator. A haptic accelerator separate from the force feedback microprocessor receives the raw sensor signals and outputs processed signals derived from the raw sensor signals, where the processed signals are sent to and used, at least in part, by the force feedback processor for determining the forces. In the preferred embodiment, the raw sensor signals represent a position of the user object in a degree of freedom, and the processed signals represent a velocity and/or an acceleration of the user object. The haptic accelerator thus performs fast and efficient velocity and acceleration determination from raw position signals.

The haptic accelerator includes logic components for fast processing of the raw sensor data into the processed data. In one embodiment, the sensor is a digital optical encoder providing two raw sensor signals, and the haptic accelerator determines a position and direction of the user object from the two raw sensor signals. The haptic accelerator preferably includes a quadrature module for determining the position data using the two raw sensor signals and a motion processing module having a counter for counting a time interval between the raw signals to determine the velocity of the user object. The haptic accelerator may also include multiple latches for storing the time interval and a previous time interval such that the haptic accelerator can determine the acceleration of the user object. Furthermore, the haptic accelerator may include fault prevention logic for detecting errors and invalid signals from the sensor, and a filter for rejecting spurious raw sensor signals. The haptic accelerator can further include a multiplexer for multiplexing the position data with the velocity data. The haptic processing unit can additionally include a summing node for summing different condition force magnitudes determined substantially simultaneously by the haptic processing unit and for outputting the resultant condition force magnitude to the actuator.

An advanced embodiment of the haptic accelerator is also included in the present invention. The advanced haptic accelerator can include the components described above as well as a haptic processing unit for determining condition force magnitudes, such as for stiffness, damping, and inertia conditions, which are output from the haptic processing unit to the actuator. The condition forces are dependent on a position, velocity, or an acceleration of the user object. In this embodiment, the force feedback processor preferably determines time-varying effect forces, such as jolts and vibrations. The haptic accelerator can include a parameter storage register for storing parameters received from the force feedback processor that modify the condition forces determined by the haptic processing unit, such as a spring constant, a damping constant, and a simulated mass constant. In some embodiments, the force feedback processor outputs effect forces to the haptic processing unit, and the haptic processing unit sums the effect forces with the condition forces and outputs the summed forces to the actuator.

In the preferred embodiment, the force feedback processor is a device microprocessor separate from the host computer system and local to the force feedback interface device. The device microprocessor receives high-level host commands from the host computer, computes force magnitudes in response to the high-level commands, and outputs the force magnitudes to the actuator. Alternatively, the force feedback processor is a microprocessor included in the host computer system. A method of the present invention provides fast computation of forces for a force feedback interface device and can be implemented in a similar manner to the apparatus described above.

An analog embodiment of the force feedback device includes an analog position sensor for outputting an analog position signal, an analog circuit separate from the host computer which receives the raw analog position signals, computes an analog velocity of said user object from the position, and outputs processed signals derived from the position signals and which include representations of the computed velocity. A device microprocessor (or other force feedback processor) computes forces and receives the analog position signal and the processed signals from the analog circuit and uses the analog position and velocity, at least in part, to determine the forces to be output on the user object.

In another aspect of the present invention, smooth force sensations are provided to a user manipulatable object used in a force feedback interface device that is coupled to a host computer executing a program with which the user interacts. Sensor signals from the interface device are executing a program with which the user interacts. Sensor signals from the interface device are used, at least in part, in the determination of force values to be output to a brushless motor (e.g., DC motor) included in the interface device. Force signals are output, equivalent to the force values, to the brushless motor using sinusoidal commutation, where the force values are converted into forces applied to the user object by the brushless motor, which preferably operates at low speeds. The forces are coordinated with events displayed within the program. In some embodiments, a haptic accelerator on the force feedback device may include a controller for sinusoidal commutation of the brushless motor. This sinusoidal commutation provides the high-fidelity forces necessary in a force feedback interface device using a brushless motor.

The methods and apparatus of the present invention advantageously provide increased ability in a force feedback device to quickly and realistically output forces to a user manipulated object in coordination with an application program updated on a host computer. The haptic accelerator of the present invention is dedicated to simple but computationally burdensome tasks such as determining velocity and acceleration from position information of the user object, and can handle such tasks in parallel and more quickly than the force feedback processor. The advanced haptic accelerator performs additional tasks such as the determination of condition forces. This functionality allows these computationally burdensome tasks to be offloaded from the force feedback processor, allowing that processor to more quickly and efficiently determine other forces and to oversee other force feedback tasks. This also allows the force feedback processor and interface device to be implemented as a much more inexpensive device, which is critical in the home and video game mass market. Other features of the present invention allow realistic and effective forces to be provided with a low cost interface device.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
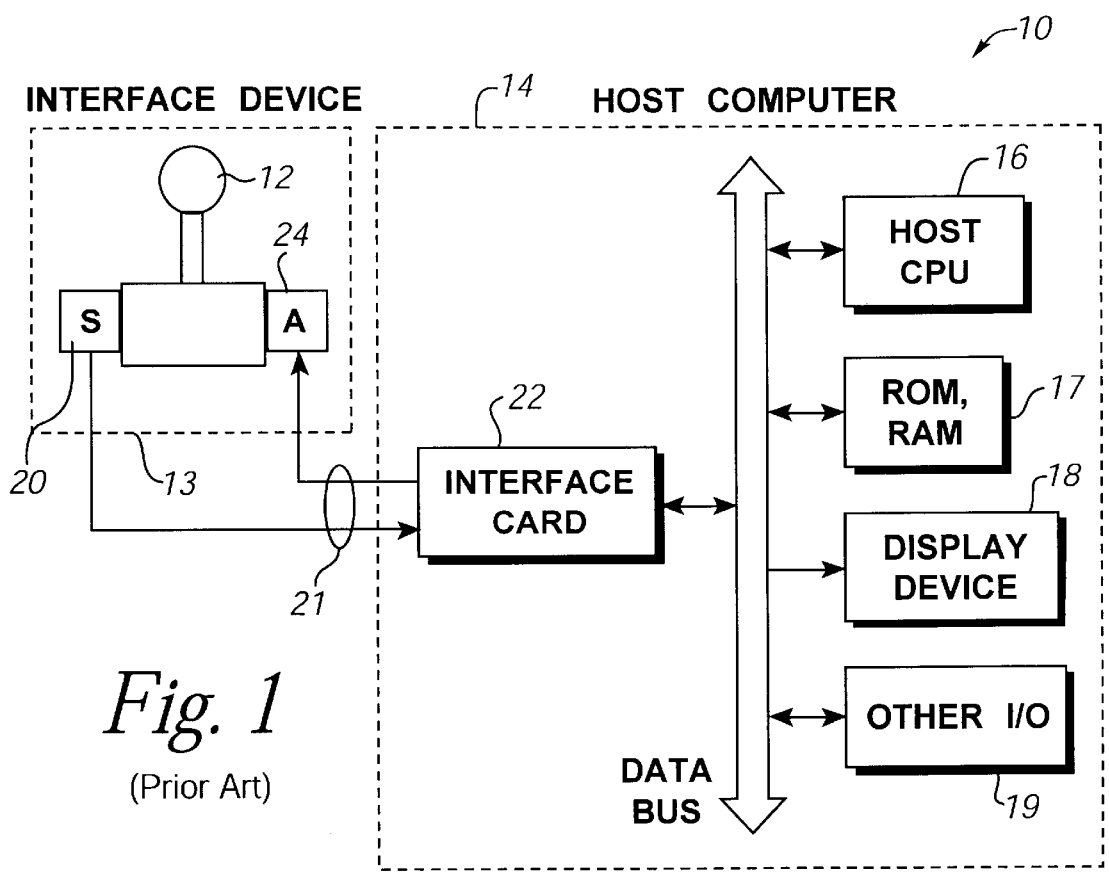
FIG. 1 is a block diagram of a force feedback system of the prior art using direct host-controlled forces.
Figure 2:
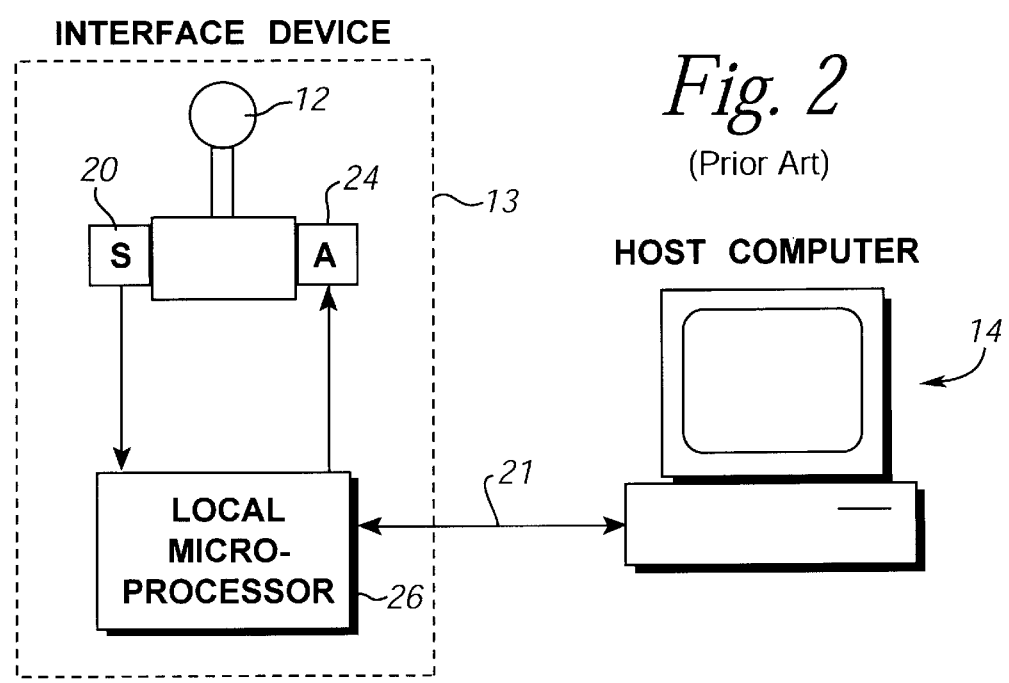
FIG. 2 is a block diagram of a force feedback system of the prior art using a local microprocessor for control of forces.
Figure 3:
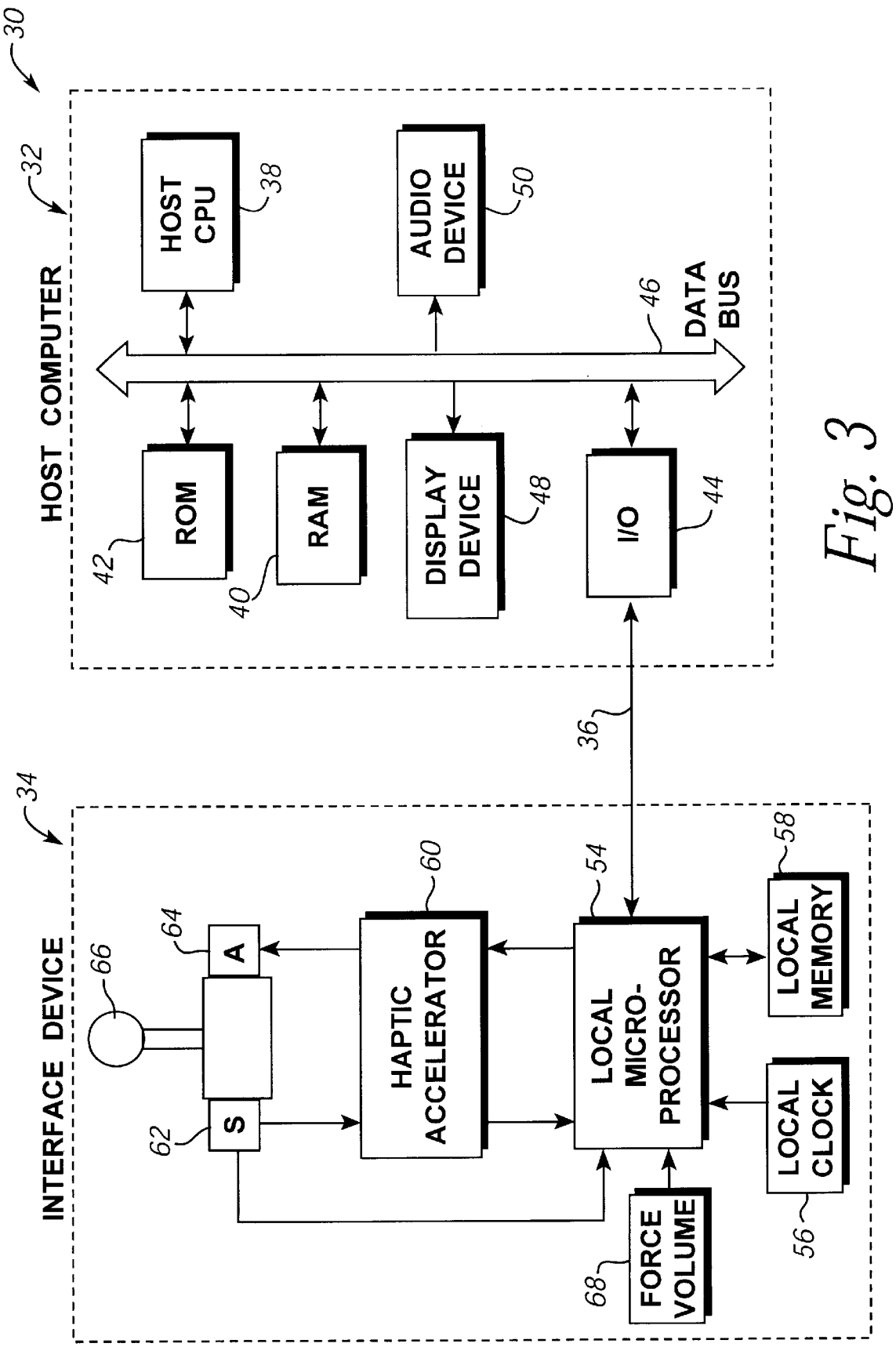
FIG. 3 is a block diagram of a force feedback system of the present invention including a haptic accelerator for assistance in the computation of forces.

FIG. 3 is a block diagram of a force feedback system 30 including a computational architecture of the present invention for use in force feedback interface devices. System 30 includes a host computer 32, an interface device 34, and a communication bus 36.

Host computer 32 is preferably a personal computer, workstation, video game console, or other computing or display device, such as an IBM-PC compatible computer or Macintosh personal computer, a SUN or Silicon Graphics workstation, a video game console available from Nintendo, Sega, or Sony, a "set top box" which can be used, for example, to provide interactive television or Internet functions to users, or a "network" or "internet" computer which allows users to interact with a local or global network using standard connections and protocols such as used for the Internet and World Wide Web. Host computer 32 commonly includes a host CPU 38 (or host microprocessor), random access memory (RAM) 40, read-only memory (ROM) 42, input/output (I/O) electronics 44, a data bus 46, a display device 48, and an audio output device 50. Host CPU 38 can include a variety of available microprocessors from Intel, AMD, Motorola, Cyrix, or other manufacturers. Microprocessor 38 can be single microprocessor chip, or can include multiple primary and/or co-processors. CPU 38 preferably retrieves and stores instructions and other necessary data from RAM 40 and ROM 42 as is well known to those skilled in the art.

Host computer 32 preferably implements a host application program with which a user is interacting via interface device 34 and other peripherals, if appropriate. For example, the host application program can be a video game, Web page, medical simulation, word processor, CAD program, or other application program that utilizes input from interface device 34 and outputs force feedback to the interface device 34. Herein, for simplicity, operating systems and graphical user interfaces, such as Windows™, MS-DOS, MacOS, Unix, X-Windows, etc. are also referred to as "application programs." Also, computer 32 may be referred as displaying "graphical objects" or "computer objects." These objects are not physical objects, but are logical software unit collections of data and/or procedures that may be displayed as images by computer 32 on display screen 48, as is well known to those skilled in the art. For example, a displayed cursor or a simulated cockpit of an aircraft might be considered an "object". Suitable software drivers which interface software with computer input/output (I/O) devices are well known to those skilled in the art.

Display device 48 can be included in host computer 32 and can be a standard display screen (LCD, CRT, etc.), 3-D goggles, projector, or any other visual output device. Typically, the host application program provides images to be displayed on display device 48 and/or other feedback, such as auditory signals. Images describing a GUI, a simulation, a moving, first person point of view can be displayed, as in a virtual reality game, or a third-person perspective of objects, backgrounds, etc. can be displayed. Audio output device 50, such as speakers, can be coupled to host CPU 38 via amplifiers, filters, and other circuitry well known to those skilled in the art. Host CPU 38 outputs signals to speakers to provide sound output to the user when an "audio event" occurs during the implementation of the host application program. Other types of peripherals can also be coupled to host CPU 38, such as storage devices (hard disk drive, CD ROM drive, floppy disk drive, etc.), printers, and other input and output devices. Data bus 46 is internal to host computer 32 and allows communication between the various components of the host computer.

Communication bus 36 couples the host computer 32 to the interface device 34. Host computer system 32 can receive sensor signals or data via communication bus 36 from sensors of interface device 34 and other information. CPU 38 can receive data from bus 36 using I/O electronics 44, and can use I/O electronics 44 to control other peripheral devices. Host computer system 32 can also output commands to interface device 34 via bus 36 to cause force feedback for the force feedback system 30.

The bi-directional bus 36 sends signals in either direction between host computer 32 and the interface device 34. Bus 36 can be a serial interface bus providing data according to a serial communication protocol, a parallel bus using a parallel protocol, or other types of buses. An interface port of host computer 32, such as an RS232 serial interface port, connects bus 36 to host computer 32. One preferred serial interface used in the present invention is the Universal Serial Bus (USB). The USB standard provides a relatively high speed serial interface that can provide force feedback signals in the present invention with a high degree of realism. USB can also source power to drive actuators and other devices, allow multiple devices to share the same bus, and provide timing data that is encoded along with differential or position data. In another embodiment, an additional bus can be included to communicate between host computer 32 and interface device 34 which is coupled to a second port of the host computer, such as a "game port", such that two buses are used simultaneously to provide an increased data bandwidth.

Interface device 34 (which can be considered a "peripheral" of host 32) includes a local microprocessor 54, local clock 56, local memory 58, haptic accelerator 60, sensors 62, actuators 64, and user manipulatable object 66. Interface device 34 may also include additional electronic components for communicating via standard protocols on bus 36. Some electronic components of interface device 34 can alternatively be included in host 34 or in its own separate housing.

Local microprocessor 54 preferably coupled to bus 36 and may be closely linked to interface device 34 to allow quick communication with other components of the interface device. Processor 54 is considered "local" to interface device 34, where "local" herein refers to processor 54 being a separate microprocessor from any processors or CPU's 38 in host computer 32. "Local" also preferably refers to processor 54 being dedicated to force feedback and sensor 110 of the force feedback interface system 30, and being closely coupled to sensors and actuators of the interface device 34, such as within the housing of or in a housing coupled closely to device 34. Microprocessor 54 can be provided with software instructions to perform various functions or tasks, including waiting for commands or requests from host computer 32, parsing/decoding the command or request, and handling/controlling input and output signals according to the decoded command or request. In addition, processor 54 preferably operates independently of host computer 32 by reading sensor signals and calculating appropriate forces utilizing those sensor signals, time signals, and force processes selected in accordance with a host command, and output appropriate control signals to the actuators. Suitable low-cost microprocessors for use as local microprocessor 54 include the MC68HC711E9 by Motorola and the PIC16C74 by Microchip, for example. Microprocessor 54 can include one microprocessor chip, or multiple processors and/or co-processor chips. In other embodiments, microprocessor 54 can include digital signal processor (DSP) functionality.

For example, in one host-controlled embodiment that utilizes microprocessor 54, host computer 32 can provide low-level force commands over bus 36, which microprocessor 54 directly transmits to the actuators. In a different, local control loop embodiment, host computer 32 provides high level supervisory commands to microprocessor 54 over bus 36, and microprocessor 54 manages low level force control loops to sensors and actuators in accordance with the high level commands and independently of the host computer 32. In the local control embodiment, the microprocessor 54 can process inputted sensor signals to determine appropriate output actuator signals by following the instructions of a "force process" that may be stored in local memory and includes calculation instructions, formulas, force magnitudes, or other data. The force process can command distinct force sensations, such as vibrations, textures, jolts, or even simulated interactions between displayed objects. Sensor signals received and used by microprocessor 54 are also reported to host computer 32, which updates a host application program and outputs force control signals as appropriate. For example, if the user moves a user manipulatable object, the computer 32 receives position and/or other signals indicating this movement and can move a displayed cursor in response. These embodiments are described in greater detail in co-pending applications Ser. Nos. 08/534,791 and 08/566,282, now U.S. Pat. Nos. 5,739,811 and 5,734,373, respectively, both incorporated by reference herein in their entirety.

A local clock 56 can be coupled to the microprocessor 54 and haptic accelerator 60 to provide timing data, similar to system clock 46 of host computer 32; the timing data might be required, for example, to compute forces output by actuators 62 (e.g., forces dependent on calculated velocities or other time dependent factors). In alternate embodiments using the USB communication interface, timing data for microprocessor 54 (and, in some embodiments, for haptic accelerator 60) can be retrieved from the USB interface.

Local memory 58, such as RAM and/or ROM, is preferably coupled to microprocessor 54 in interface device 34 to store instructions for microprocessor 54 and store temporary and other data. Microprocessor 54 may also store calibration parameters in a local memory 58 such as an EEPROM. Memory 58 may be used to store the state of the force feedback device or other information.

Haptic accelerator 60 of the present invention is an integrated circuit (IC) coupled to microprocessor 54 and to sensors 62 and actuators 64 of the interface device which performs support functions for local microprocessor 54. The support functions are associated with closed loop "condition" sensations which are computationally burdensome to the local microprocessor 54. Haptic accelerator 60 can be implemented according to different embodiments; a basic embodiment is described with reference to FIG. 4, and an "advanced" embodiment is described with reference to FIG. 5. The haptic accelerator 60 can be implemented on a separate IC from microprocessor 54, or alternatively on the same portion of silicon on which microprocessor is implemented. Also, haptic accelerator 60 can be implemented as a digital signal processor (DSP) or the equivalent, especially if the functions of the haptic accelerator are to be optimized for mathematical operations. In yet other embodiments, the haptic accelerator (or the haptic processing unit within the advanced haptic accelerator) can be implemented as a (low-level) microprocessor, separate from the (high-level) local microprocessor 54 and working in conjunction with microprocessor 54. Thus, two local microprocessors can be used: one for overseeing communication with the host computer and determining time varying effect forces, and the other for performing haptic-specific tasks such as determining velocity/acceleration and condition forces. This functionality is described in greater detail below. In such an embodiment, the haptic accelerator microprocessor might be the same type of microprocessor as processor 54, or a lower cost microprocessor.

Sensors 62 sense the position, motion, and/or other characteristics of a user object 66 along one or more degrees of freedom and provide signals to microprocessor 54 including information representative of those characteristics. Typically, a sensor 62 is provided for each degree of freedom along which object 66 can be moved, or, a single compound sensor can be used for multiple degrees of freedom. Example of sensors suitable for embodiments described herein are digital rotary optical encoders, which sense the change in position of an object about a rotational axis and provide digital signals indicative of the change in position. Linear optical encoders may similarly sense the change in position of object 66 along a linear degree of freedom. A suitable optical encoder is the "Softpot" from U.S. Digital of Vancouver, Wash. Alternatively, analog sensors such as potentiometers can be used. It is also possible to use non-contact sensors at different positions relative to interface device 34, such as Polhemus (magnetic) sensors for detecting magnetic fields from objects, or an optical sensor such as a lateral effect photo diode having an emitter/detector pair. Furthermore, either relative or absolute sensors can be employed.

A sensor interface (not shown) may optionally be included in interface device 34 to convert sensor signals to signals that can be interpreted by the microprocessor 54 and/or host computer 34. For example, a digital sensor interface (for digital sensors) or an analog sensor interface (for analog sensors) can be used. Such circuits, or equivalent circuits, are well known to those skilled in the art. For example, an electronic interface is described in U.S. Pat. No. 5,576,727, which is hereby incorporated by reference herein. Alternately, microprocessor 54 (and/or haptic accelerator 60) can perform these interface functions without the need for a separate sensor interface. Or, sensor signals from the sensors can be provided directly to host computer 32, bypassing microprocessor 54 and haptic accelerator 60.

Actuators 64 transmit forces to user object 66 in one or more directions along one or more degrees of freedom in response to signals output by microprocessor 54 and/or host computer 34, i.e., they are "computer controlled." Typically, an actuator 64 is provided for each degree of freedom along which forces are desired to be transmitted. Actuators 64 can include two types: active actuators and passive actuators. Active actuators include linear current control motors, stepper motors, pneumatic/hydraulic active actuators, a torquer (motor with limited angular range), a voice coil actuator, and other types of actuators that transmit a force to an object. Passive actuators can also be used for actuators 64, such as magnetic particle brakes, friction brakes, or pneumatic/hydraulic passive actuators, and generate a damping resistance or friction in a degree of motion. In yet other embodiments, passive (or "viscous") damper elements can be provided on bearings of a mechanical apparatus of interface device 34. In some embodiments, all or some of sensors 62 and actuators 64 can be included together as a sensor/actuator pair transducer.

An actuator interface (not shown) can be optionally connected between the actuators 64 and microprocessor 54. The interface converts signals from microprocessor 54 into signals appropriate to drive the actuators. The interface can include power amplifiers, switches, digital to analog controllers (DACs), and other components. Such interfaces are well known to those skilled in the art. In alternate embodiments, actuator interface circuitry can be provided within microprocessor 54, within haptic accelerator 60, or within the actuators. A power supply (not shown) can optionally be coupled to actuators 64 to provide electrical power. Active actuators typically require a separate power source to be driven. Alternatively, if the USB or a similar communication protocol is used, actuators and other components can draw power from the USB and thus have no (or reduced) need for a power supply.

User manipulatable object 66 ("physical object" or "manipulandum") is preferably grasped or gripped and manipulated by a user in degrees of freedom provided by the interface device 34. By "grasp," it is meant that users may releasably engage a portion of the object in some fashion, such as by hand, with their fingertips, or even orally in the case of handicapped persons. For example, images can be displayed and/or modified on display screen 48 of the computer 34 in response to such manipulations. Suitable user objects 66 include a joystick, mouse, stylus, steering wheel, aircraft control, pool cue, medical instrument, or other article.

A mechanical apparatus (not shown) is typically used in interface device 34 to provide degrees of freedom of movement for user manipulatable object 66. The mechanical apparatus can be one of several types of mechanisms, including a gimbal mechanism, slotted yoke mechanism, flexible structure, etc. For example, mechanisms disclosed in co-pending patent applications Ser. Nos. 08/344,148, 08/560,091, 08/664,086, 08/709,012, 08/736,161, 08/756, 745, and U.S. Pat. Nos. 5,576,727, 5,623,582, 5,731,804, 5,767,839, 5,721,566, and 5,691,898 all hereby incorporated by reference herein in their entirety, can be included.

Other input devices (not shown) can also optionally be included in interface system 30 and send input signals to microprocessor 54 and/or host computer 32. Such input devices can include buttons, such as buttons on the user object 66 (e.g. a mouse or joystick) used to supplement the input from the user to a GUI, game, simulation, etc. Also, dials, switches, foot pedals, voice recognition hardware (with software implemented by host 34) or other input mechanisms can be used. A safety or "deadman" switch can also be included to provide a mechanism to allow a user to override and deactivate the actuators 64 or require a user to activate the actuators, for safety reasons. Some embodiments of safety switches are described in co-pending U.S. Pat. No. 5,691,898.

One input device that is preferably included in interface device 34 is a haptic "volume" knob or force volume knob 68. Volume knob 68 can be adjusted by a user to reduce or increase the magnitude of forces output by actuators 64. The user can thus adjust the overall level of forces to a desired or preferred level during normal operation of the force feedback system independently of software running on the host computer 34. In addition, certain force volume settings can be provided for specific purposes; for example, one setting of the knob or switch can be recommended for adults, while the other, lower-magnitude force setting can be recommended for children. Or, a player may wish to lower the overall magnitudes of forces after playing a force-feedback game for some time, and can switch the forces from a high-magnitude "turbo" mode to a lower-magnitude "normal" mode. Preferably, the microprocessor 54 (or haptic accelerator 60) can handle force volume functions by checking the state of the knob constantly, by waiting for an input signal from the knob, or by receiving an interrupt signal from the knob. The microprocessor 54 can multiply a determined total force by a constant dictated by the position of the volume knob and output the final force accordingly. Alternatively, a separate component or circuit can be used to limit current to the actuators 64 or otherwise adjust the magnitude of output forces. Such a component can be coupled between a power supply and actuators, or in another position allowing force magnitudes to be reduced after the microprocessor/haptic accelerator have determined the force. In other embodiments, force 68 volume control can be implemented as a slider, lever, buttons, switch, or other input device.

In some embodiments of interface system 30, multiple interface devices 34 can be coupled to a single host computer 34 through bus 36 (or multiple buses 36) so that multiple users can simultaneously interface with the host application program or host computer (in a multi-player game or simulation, for example). In addition, multiple users can interact with the host application program and with each other using multiple interface systems 30 and networked host computers 34, as is well known to those skilled in the art.

In another mode of the force feedback interface device 34, force feedback can be generated for a user completely independently of host commands and host computer 34. For example, "reflex" forces can be output by actuators 64 whenever a certain input or event occurs, such as when a button on interface device 34 is pressed by the user. The microprocessor detects the activation or press of the button and the microprocessor and/or haptic accelerator immediately outputs a force or sequence of forces that are associated with the button and also based on other conditions, but does not need any commands from the host when outputting these forces in the reflex mode. However, a previous command from the host computer can associate a particular reflex force sensation with a button or other event. Such an embodiment is described in greater detail in copending U.S. Pat. No. 5,691,898.

In a "demonstration" mode similar to the reflex mode, interface device 34 can produce predetermined forces when the user object 66 is moved or manipulated by the user. The microprocessor 54 does not report data to the host computer or supervise communication to the host computer when in this mode, nor does it receive host commands. Instead, forces are generated solely based on button or other input device activations and motion of the user object, completely independent of the host computer. A force "volume" knob and other controls (such as described above) may be provided on the user object to allow the user to select different force outputs, effects, conditions, and/or force magnitudes. The forces produced can be any of the previously mentioned force effects or conditions, such as a stiffness condition or jolt effect; or virtual walls, springs, textures, etc. can also be output forces in this mode. Demonstration mode is quite useful to demonstrate to potential customers the functionality of the interface device 34 without requiring that a host computer 32 be connected to the interface device. For example, in a store having a display of several joysticks, a store manager may not desire to connect a host computer to each joystick having force feedback functionality. Yet, it is desirable to allow the customers to manipulate the joysticks in actual operation to allow them to experience the forces produced by the joystick. The demonstration mode allows customers to sample a wide range of force sensations produced by a particular device while allowing the store manager flexibility in providing demonstration models.

Figure 4:
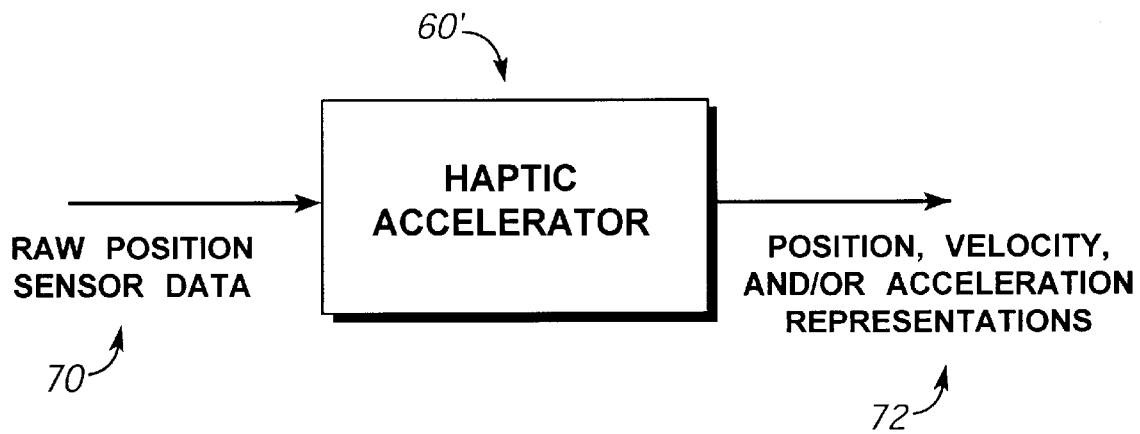
FIG. 4 is a block diagram of a basic embodiment of the haptic accelerator of the present invention.

FIG. 4 is a block diagram illustrating a basic embodiment 60' of haptic accelerator 60 of the present invention. Haptic accelerator 60' is preferably hard-wired circuitry that performs processing on incoming sensor data; one circuitry embodiment is described below with respect to FIG. 8. Accelerator 60' preferably receives raw sensor data 70 from sensors 62, such as digital pulses output when an incremental change in a rotary or linear shaft is detected by the sensor. Accelerator 60 then generates processed data or signals 72 representative of the position, velocity and/or acceleration of the user manipulatable object 66 in one or more degrees of freedom and sends the signals 72 to microprocessor 54 (and/or to host CPU 38). Haptic accelerator 60 can receive inputs from multiple sensors, such that position, velocity and acceleration data for each of the sensors is output as processed signals 72.

In the preferred embodiment, sensor 62 is a digital encoder that provides digital pulses as a portion of the sensor that is coupled to the user object 66 moves incremental distances. In the preferred embodiment, this is an optical encoder with an A channel for sending A pulses and a B channel for sending B pulses; for example, a suitable optical encoder is the HED5550 made by Hewlett-Packard. The A and B pulses do not track absolute position, but are simply output by the sensor each time an incremental step or distance is passed (i.e., the pulses track relative position). For example, using a rotary optical encoder, pulses are sent out on A channel and B channel as a rotary encoder disk that is coupled to a rotatable shaft is rotated about an axis such that detectors in the encoder detect the disk's incremental movement. Two channels are used so that the haptic accelerator 60 can monitor not only the number of pulses as the shaft rotates, but also the direction that the shaft is rotating. A linear optical encoder functions similarly with linearly moving parts. Using these pulses from sensor 62, haptic accelerator 60 can generate signals 72 representative of the incremental position change of the user object, can generate processed signals 72 representative of the velocity, and can also optionally generate processed signals 72 representative of the acceleration of the user object. The method by which the haptic accelerator generates data 72 representative of position, velocity, and acceleration based on an input of raw encoder pulses will be described in detail below. The haptic accelerator 60 makes the position, velocity, and/or acceleration data available to the local microprocessor 54 or host computer 32 that is overseeing creation of force feedback sensations. Such position, velocity, and/or acceleration data is important because "condition" force sensations require such data to be implemented effectively. "Conditions" or "condition forces", as the terms are used herein, refer to force sensations that depend on motion of the user manipulatable object. For example, a "stiffness" or "restoring spring" feel sensation requires position data, a damping feel sensation requires velocity data, and an inertia feel sensation requires acceleration data. A stiffness condition provides a force sensation such that force applied to the user manipulatable object is proportional to a displacement X of the user object as modified by a constant k (F=kX). This can produce a spring-like force on the user object, where the force in a particular direction may get stronger (or weaker) in proportion to the distance from an origin point or other location. A damping condition provides a force sensation such that force is proportional to a velocity V (or velocity squared) as modified by a constant b (F=bV or F=bV*V). This can produce a "sluggish" force sensation, as if the user manipulatable object were moved through a thick liquid or other viscous material. An inertia condition provides a force feedback sensation such that force is proportional to acceleration A as modified by a constant m (F=mA), and can be used to produce a simulated mass or weight on virtual objects when the objects are "carried" by a user-controlled graphical object. Friction is another condition that may be implemented as a constant force in a direction opposing the direction of movement of the user manipulatable object. These types of condition forces are also described in detail below. Herein, the term "motion of the user object" refers to position, velocity, and acceleration, or even other motion-derived characteristics, of the user object as it moves in one or more degrees of freedom.

The above-described haptic accelerator 60 has many benefits to force feedback system 30. In the prior art, there are two ways that position, velocity, and/or acceleration data has been made available to the processor performing control over force feedback sensations. One method has been to use multiple sensors: position sensors such as encoders, velocity sensors such as tachometers, and acceleration sensors such as accelerometers. The processor reads data from each of these sensors to receive very accurate and high speed data. While ideal, this is a very costly solution that is economically impossible for low-cost consumer products. In an ideal low cost embodiment, a single sensor is used (such as a position sensor) from which velocity and/or acceleration data is generated. This, too, is presented in the prior art, but in all cases, the computation of velocity and/or acceleration from digital position data is performed by the processor that is overseeing the force feedback sensations. This is a substantial burden to the processor because velocity and acceleration must be computed very quickly to provide realistic conditions and other force sensations to the user, and because the processor has other computational obligations such as executing application programs or overseeing communication. The haptic accelerator 60, by generating velocity and/or acceleration data separately from the force feedback processor, greatly reduces the burden on the processor. The circuitry of haptic accelerator 60 is also superior to a microprocessor at generating the velocity and acceleration data because it can deal with rapid asynchronous events better than a serial microprocessor that handles asynchronous events using interrupts. In addition, the haptic accelerator 60 can function very quickly because it does not need to handle other functions, thus generating very accurate data. Finally, the haptic accelerator is not a microprocessor, and thus can generate multiple signals in parallel and easily process signals from multiple sensors simultaneously without a problem.

Figure 5:
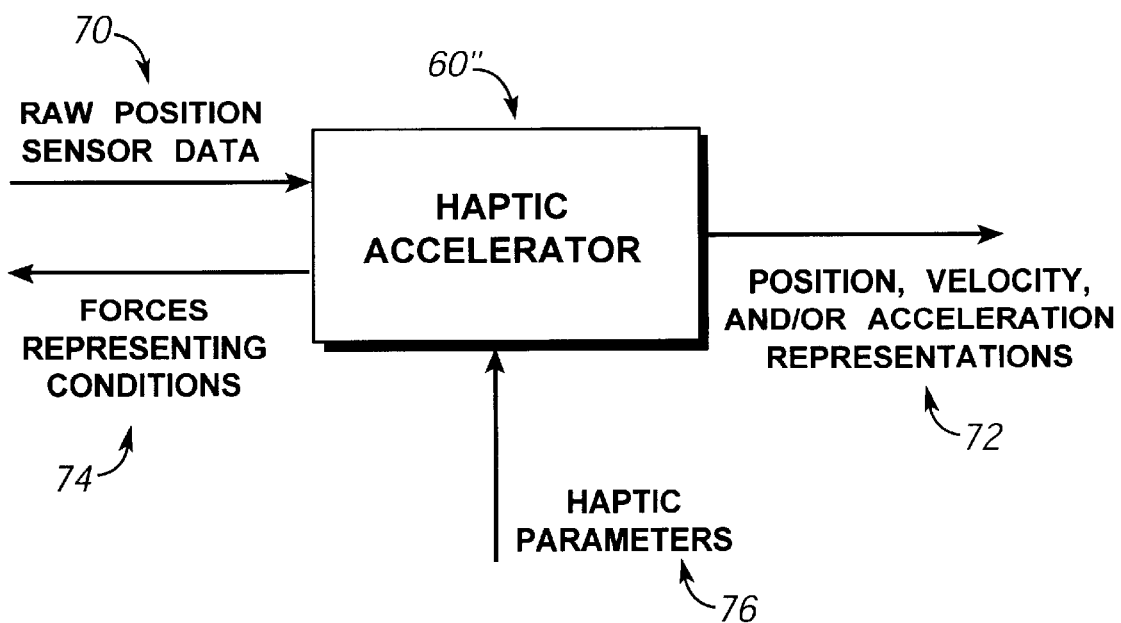
FIG. 5 is a block diagram of an advanced embodiment of the haptic accelerator of the present invention.

FIG. 5 is a block diagram of an advanced embodiment of haptic accelerator 60". This version of the haptic accelerator includes all of the functionality described with reference to FIG. 4 for the basic embodiment, and also includes additional functionality which further reduces the burden on the force feedback processor. As described above, a force feedback "condition" includes force feedback sensations wherein the force is a function of position, velocity, and/or acceleration of the user manipulatable object. When using the architecture shown in FIG. 3 with the basic haptic accelerator of FIG. 4, the haptic accelerator 60 provides the local microprocessor 54 with representations of position X, velocity V, and acceleration A. Knowing parameters (k, b, m) and other parameters, the local microprocessor 54 then computes and outputs the force values (i.e. force magnitudes) required for conditions such as stiffness, damping, and inertia. This works well, but requires that the local microprocessor continually perform these simple condition operations (such as F=kX) and output values to the actuators very quickly (ideally, at least 1000 times per second). In other words, the force feedback processor is closing the loop for the condition forces which is computationally very simple but is a burden because it needs to happen very quickly to remain stable.

The alternate embodiment illustrated in FIG. 5 demonstrates that this burden can also be removed from the microprocessor by implementing the haptic accelerator 60" to accept parameters such as k, b, and m from the microprocessor and then to compute and control condition forces independently of the microprocessor. In other words, the haptic accelerator 60" closes the loop for condition sensations, allowing the microprocessor to perform supervisory control by modulating parameters when necessary but not closing the loop. Thus, as shown in FIG. 5, haptic accelerator 60" receives raw sensor signals 70 from sensors 62 and outputs position, velocity, and/or acceleration signals 72 ("processed data") to the microprocessor, as explained above. The microprocessor then sends all or part of the processed data to the host computer (if applicable) and/or uses the processed data in the determination of effect forces (described below). In addition, haptic accelerator 60" computes and outputs force control signals or force values 74, representing condition forces, to actuators 64. Haptic accelerator 60" also receives haptic parameters 76, such as k, b, m, or other parameters, from microprocessor 54 (or host computer 32) which customize the conditions and affect the computation of condition forces. For example, the haptic accelerator 60" can compute force F from the equation F=kx, where the parameter k is input from the microprocessor. The relationships such as F=kx, F=ma, and F=bV are preferably hardwired into the haptic accelerator circuitry to provide the fastest computation speed. Other condition forces, such as texture and friction, can also be implemented by the haptic accelerator. For example, a spatially-varying texture would provide a force depending on the spatial position of the user object 66 to achieve a desired force sensation, such as a stick being dragged over a grating, where the texture output force is zero when the user object is between simulated "bumps" and the texture output force is a predetermined magnitude when the user object is on a simulated bump. This texture can also be used in conjunction with other conditions, such as a damping force, or with effects such as jolts. Friction can be implemented as essentially a normalized damping force, where a force of constant magnitude resists motion of the user object according to a friction coefficient, and can be modeled as realistically as possible with the constraints of the hardware used. In alternate embodiments, the haptic accelerator can also determine more complex conditions according to more complex equations or algorithms.

In the advanced embodiment of haptic accelerator 60", the microprocessor 54 or 38 is not required to compute condition forces, since haptic accelerator is doing so. However, other types of forces, also known as "effect forces", "effects" or "open loop forces", should continue to be computed and controlled by the microprocessor 54. Effects are such forces as jolts, vibrations, or other forces that do not necessarily require position, velocity or acceleration data to be determined. Some effect forces or other forces computed by microprocessor 54, however, may require position, velocity and/or acceleration data; thus, the processed data 72 is still sent to the microprocessor. In some embodiments, processed data 72 need only include position data; optionally, it may include the velocity and/or acceleration data as well.

As an example, a force feedback mouse is used as a user object 66 as described in co-pending application Ser. No. 08/756,745, incorporated by reference herein. The host computer system 32 executes an application program, such as a word processor. A cursor used to access functions in the word processor is displayed on display device 48, where the displayed location of the cursor is controlled by the position of the user manipulatable object in a user object workspace. Raw data from position sensors 62 on the interface device 34 are fed into the haptic accelerator 60", and this data is processed into position, velocity, and acceleration data and fed to the local microprocessor 54 on board the interface device 34. Microprocessor 54 prepares for transmission to the host, and at least some of the processed data (e.g., the position data) is then sent via a communication channel 36 such as a Universal Serial Bus to the host computer 32, where it is made accessible to cursor control software. The cursor in the word processor is then drawn on the display in the appropriate location. By viewing the display and controlling the user manipulatable object, the user maneuvers the cursor and interacts with the software. The cursor might interact with another graphical object in the word processor. For example, the cursor can interact with a graphical representation of a tab marker by dragging the tab-marker to a new location. As the tab marker moves, the software determines that a force sensation should be generated that is associated with simulated inertia and damping of dragging a tab marker. The software has been instructed to make the tab-marker feel heavy and viscous to the user as though there is significant resistance to sliding. This feel, for example, might facilitate accurate positioning of the tab.

To enact the force sensation associated with the tab marker, the host CPU 38 sends out a high-level command indicating that such a feel should be presented to the user. This command is transmitted over a communication channel 36 such as a Universal Serial Bus and is received by the local microprocessor 54 on board the force feedback interface device. This local processor then parses/decodes the command and controls the actuators 64 accordingly. A parameter for damping (b) and inertia (m) would likely be determined by the microprocessor (and/or sent by the host with the high level command), then a force value would be generated as a function of the manipulation of the user object, such as F=(bV+ma). The force value would cause the actuator(s) 64 to apply an appropriate force to the user object 66.

Figure 6:
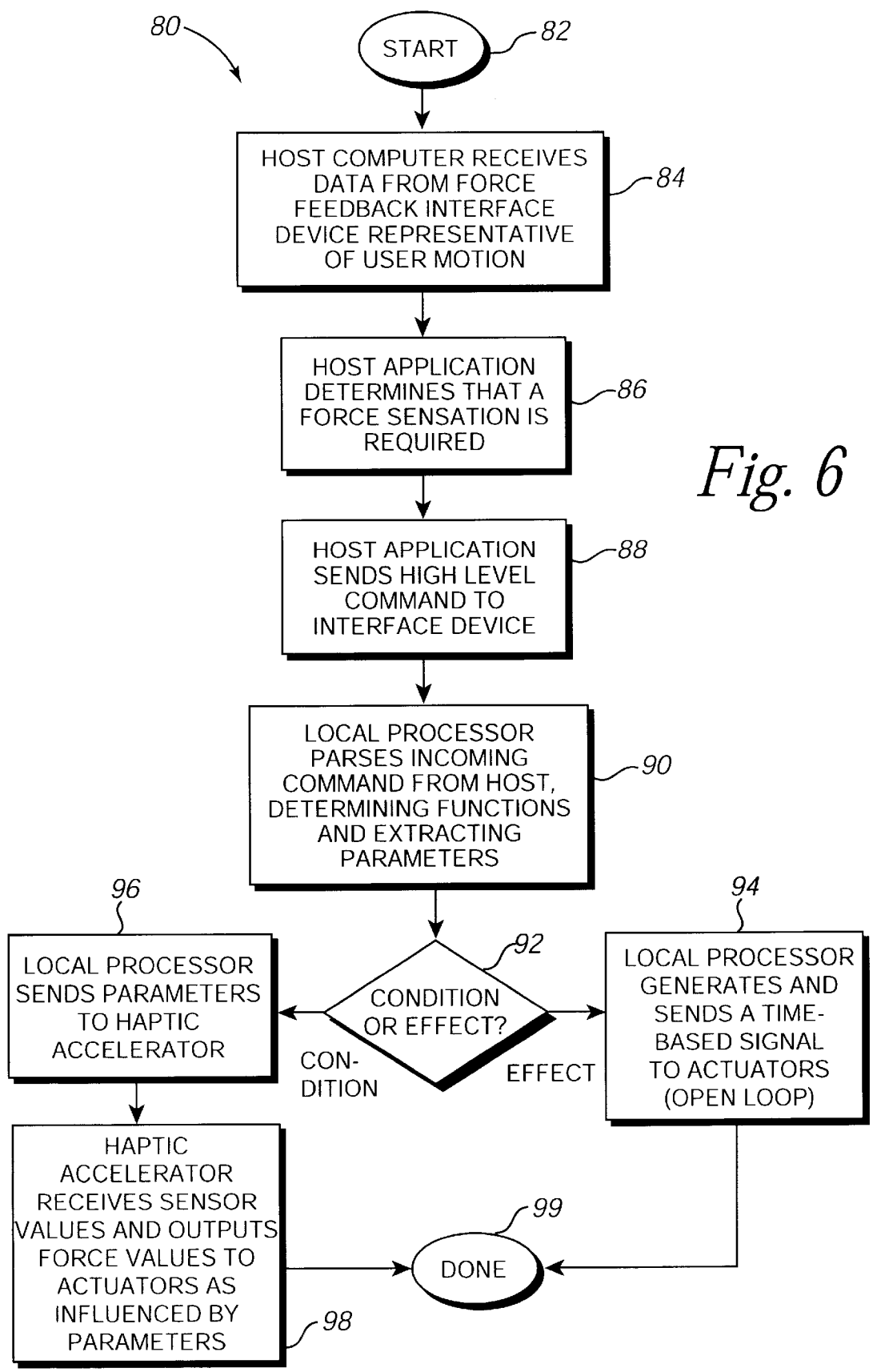
FIG. 6 is a flow diagram illustrating a method of implementing the force feedback system using a haptic accelerator of FIG. 3.

The advantage of the advanced haptic accelerator 60" is in increased offload of computational burden from the processor 54. In the case of the basic haptic accelerator of FIG. 4, the local microprocessor would receive data representative of velocity V and acceleration A from the haptic accelerator 60', multiply the values by the desired parameters, then output the appropriate force to the actuators. The local microprocessor is closing the loop, and the haptic accelerator 60' is only assisting by generating V and/or A values in parallel with microprocessor operations. However, in the case of the advanced haptic accelerator 60", the local microprocessor would set values on the input terminals of the haptic accelerator that represent the desired parameters and the haptic accelerator 60" would control the actuators directly, closing the loop itself. The parameters might include any parameters associated with the desired condition sensation such as stiffness coefficients, damping coefficients, mass values, offsets, dead-bands, and saturation values (these parameters are described in greater detail subsequently). This hardware implementation of the condition control loop within the haptic accelerator greatly offloads computational burden from the local processor 54. This is particularly helpful in the case where the local processor is also generating time varying effects such as jolts or vibrations. If the local processor is producing a vibration overlay that is to be superimposed on a condition such as a damping, the haptic accelerator 60" can generate the closed loop damping condition while the local processor 54 generates the open loop vibration effect in parallel, greatly enhancing performance. FIG. 6 describes this division of labor in greater detail.

In some embodiments, the local processor 54 can modulate parameters to the haptic accelerator 60 very quickly, thus controlling the characteristics of condition sensations at a high level but allowing the haptic accelerator to do the computation work. For example, a spring (stiffness) force might be output which has a variable spring constant depending on the position of the user object 66 or depending on other factors. The microprocessor 54 can change k quickly and output different k values to the haptic accelerator, which computes and outputs the condition force values to the actuators 64.

In addition, in an alternate embodiment, the advanced haptic accelerator 60" can receive position data from position sensors, velocity data from velocity sensors, and/or acceleration data from acceleration sensors. Although this embodiment may typically be more expensive than using only position sensors, it still allows the advanced haptic processor to control condition forces and thus offloads computational burden from microprocessor 54.

FIG. 6 is a flow diagram illustrating a method 80 of implementing the force feedback system 30 using a haptic accelerator 60. Method 80 illustrates the division of labor between the local processor and the advanced embodiment (FIG. 5) of the haptic accelerator 60 of the present invention. The process starts at 82, and in step 84, the host computer 32 receives data from the force feedback interface device 34 which is representative of motion of the user manipulatable object 66. For example, the host computer may receive position, velocity, and/or acceleration data. In next step 86, the application program running on the host computer determines that a force sensation is required to be output on the user object 66. This force sensation can be dictated by one or more of several possible factors or events in the application program, including the interaction between a user-controlled displayed graphical object (such as a cursor) or viewpoint with one or more other simulated objects, a random or simulated event in the program (such as a collision between graphical objects), an event dictated by another connected user, etc.

In step 88, the host application sends a high level command (or "host command") to the interface device 34 over communication channel 36. In step 90, the local processor 54 parses/decodes the incoming command from the host to determine functions commanded by the host and extract host parameters sent with the command. The local processor 54 is preferably running software stored in local memory 58 which parses the incoming commands. The commands may instruct the processor 54 to select and execute a routine locally stored in memory 58 to control the outputting of a desired force sensation, to read sensors, to report sensor values to the host, and/or to perform other tasks; such routines are described in greater detail in U.S. Pat. No. 5,734,374. The host parameters sent with the command may specify the particular characteristics of a commanded force sensation, such as duration, magnitude, particular degrees of freedom and/or directions in which the force is to be applied, constants (such as k, m, b), or other data. These host parameters may sometimes be embedded in a command, or may be implied; e.g., a command may have a default parameter value which the microprocessor can determine using a locally stored software table or other stored data.

In step 92, the microprocessor 54 determines whether the host command instructs a condition or an effect to be output.

Some commands may require both a condition and an effect to be implemented, in which case both branches from step 92 are performed. If an effect is instructed, step 94 is implemented, in which the local processor generates and sends a time-based signal or force value to actuators 64 in an open loop configuration. That is, the processor 54 outputs force magnitudes directly to the actuators to command forces on the user object 66, preferably according to a force routine implemented by the processor of such as an algorithm, profile or sequence of previously-stored forces, etc. The process is then complete at 99.

If a condition is instructed by the host command in step 92, then step 96 is implemented, in which the local processor sends parameters to the haptic accelerator 60". As described with reference to FIG. 5, these parameters may include mass, damping, and/or spring (m, b, k) constants, as well as other types of parameters. In step 98, the haptic accelerator 60" receives the sensor values, computes a condition force using on-board algorithms and the received parameters, and outputs force values to the actuators as influenced by the parameters. Thus, the haptic accelerator is executing force routines such as F=ma to determine and output F to the actuators. After step 98, the process is complete at 99.

In the process of FIG. 6, at its most basic level, the local processor 54 reads high-level commands from the host computer, parses those commands, and oversees the generation of force sensations. The local processor directly handles the generation of open loop effects, such as jolt and vibration forces, because these are complex time varying signals that are best handled by a processor. The open loop effects may involve complex processing to synthesize the time varying signals, but speed is not critical because stability is not an issue for open loop effects. The haptic accelerator 60 handles the generation of closed loop conditions. This is an ideal division of labor because closed loop conditions are simple to create but should be output very fast by brute force cycling; otherwise, stability requirements will be violated. Using, for example, hard-wired logic in haptic accelerator 60 is better than a processor for such functionality because the logic can function very quickly, using asynchronous input, without being burdened by other tasks or processes.

The local microprocessor 54 also performs many other functions in the preferred embodiment. The local processor oversees communication with the host computer, receives high level commands, parses the commands, oversees the generation of force sensations, oversees the superposition of conditions and effects, reads sensor values from the sensors directly or from the haptic accelerator, processes the sensor data, sends the sensor data back to the host computer, monitors basic status such as safety flags, and reports basic status of the interface device to the host computer. These functions may involve receiving host commands that instruct multiple sensations to happen simultaneously. The local processor mediates the appropriate functions and data flow to perform multiple superimposed force effects. In some embodiments, the microprocessor can synthesize a single complex wave form that combines one or more effects; for example, combining 2 different vibration forces or a jolt and a vibration force. When multiple conditions are to be output, the microprocessor can in some embodiments reduce multiple overlapping parameters to a single set of combined parameters, in effect creating a single condition that combines the multiple conditions. This is described in greater detail with respect to FIG. 13.

Figure 7:
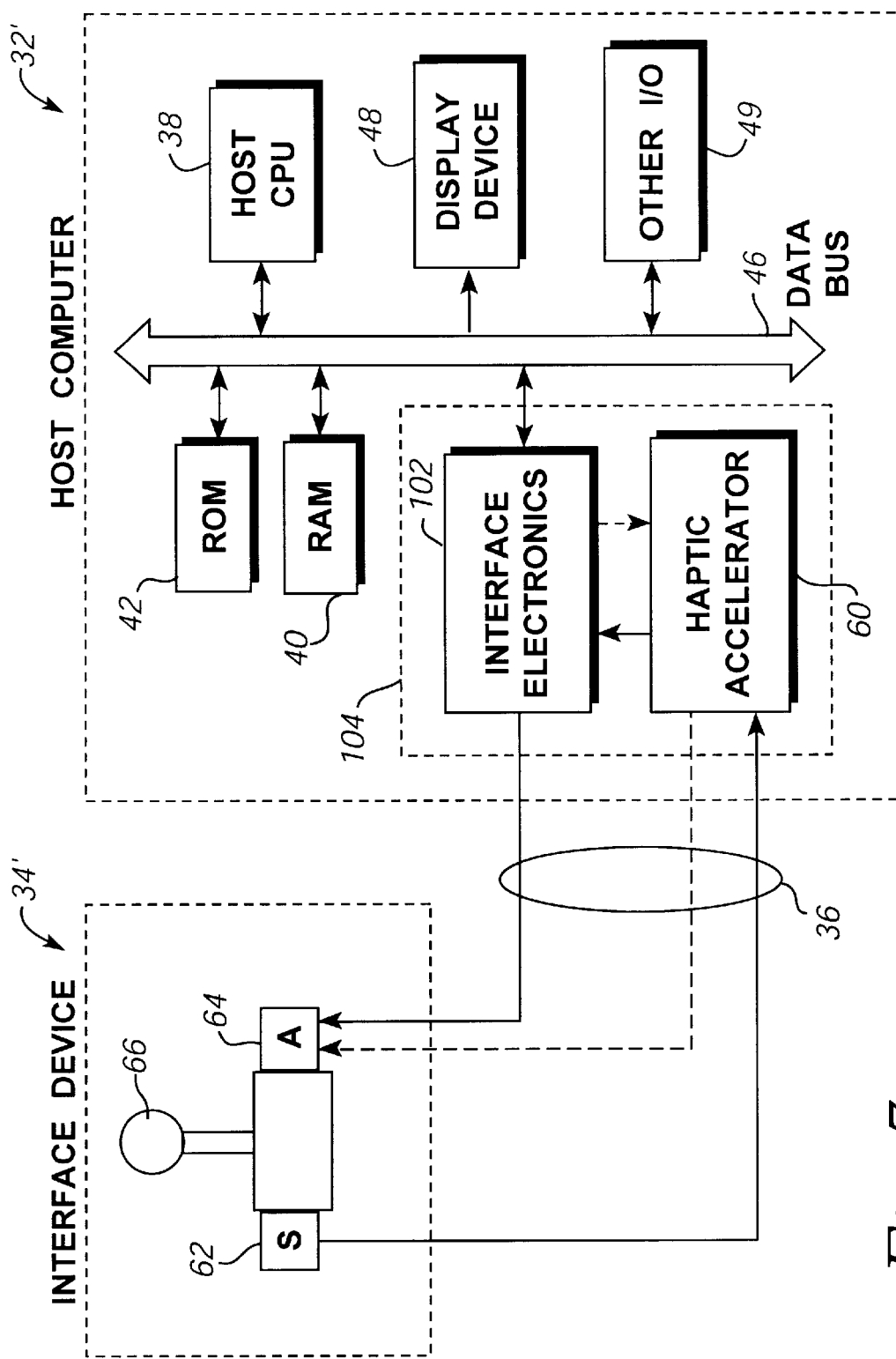
FIG. 7 is a block diagram illustrating an alternative force feedback system in which the haptic accelerator of the present invention is used in a host controlled force feedback system.

FIG. 7 is a block diagram illustrating an alternative force feedback system 100 in which the haptic accelerator 60 of the present invention is used in a host controlled force feedback system. System 100 includes a host computer 32' and an interface device 34'. Host computer 32' includes a host CPU 38, RAM 40, ROM 42, a display device 48, other I/O 49, and an audio device (not shown) coupled to a data bus 46 similar to the equivalent components described with reference to FIG. 3. In this embodiment, host CPU 38 performs the functionality of the local microprocessor 54 shown in FIG. 3, including directly controlling forces output by the actuators 64 by sending force values to the actuators.

In addition to the components described above, host computer 32' includes haptic accelerator 60 and interface electronics 102 included on an interface card 104 or similar device that can be coupled to the data bus 46 of the host computer 32'. Haptic accelerator 60 receives raw sensor signals from sensors 62 of the interface device 34', as described above. The haptic accelerator processes the raw signals into position, velocity, and/or acceleration data and sends the processed data to interface electronics 102, which provides the processed data to the host computer and thus removes the computational burden of calculating these values from the host. Interface electronics 102 provides the force values from the host CPU 38 to the actuators 64. When using the advanced haptic accelerator 60" of FIG. 5, the haptic accelerator 60 may also receive parameters from host CPU 38 via interface electronics 102, and compute and send condition force values to actuators 64 (this functionality is shown in dashed lines).

In the prior art host controlled embodiments not including a haptic accelerator 60, the host CPU was responsible for computing velocity and acceleration values and also creating both conditions and effects in a closed loop configuration. In the embodiment of FIG. 7, the haptic accelerator 60 reduces the computational burden from the host CPU 38 in the generation of velocity and acceleration values and closed loop condition sensations.

Figure 8:
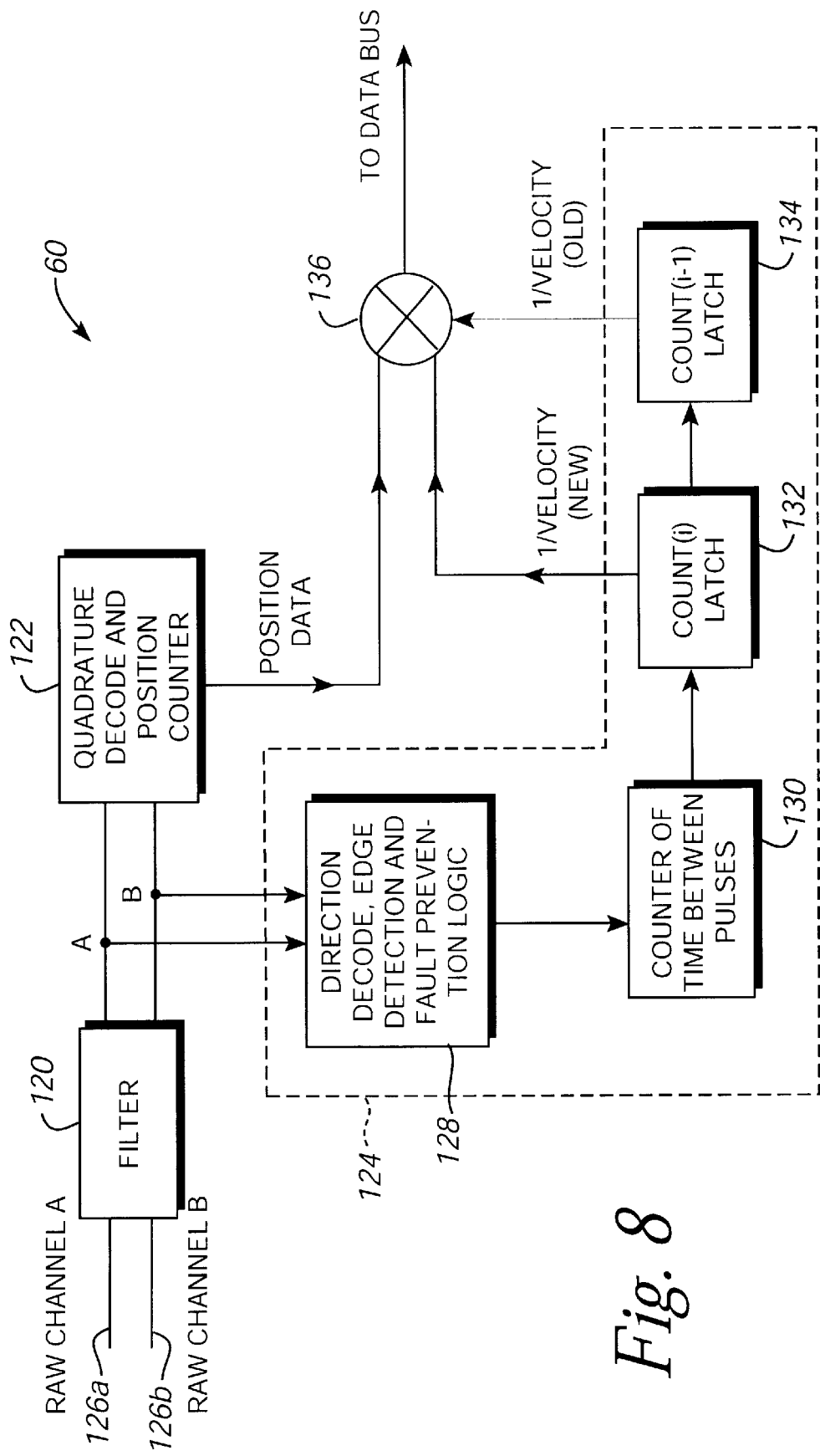
FIG. 8 is a block diagram of the basic haptic accelerator of the present invention.

FIG. 8 is a block diagram of the haptic accelerator 60' of the present invention. The haptic accelerator 60 can in some embodiments be implemented in a programmable logic device (PLD), field-programmable gate array (FPGA), DSP, some other programmable logic device, or an application specific integrated circuit (ASIC). Several subsystems are shown, some or all of which may be implemented in a specific embodiment. The subsystems include a filter 120, a quadrature counter 122, and motion processing module 124.

Raw sensor signals 70 are initially input to the haptic accelerator from sensors 62 of the interface device 34. In the preferred embodiment, a two channel optical encoder is used as the sensor 62, which provides two channels of data on lines 126a and 126b simultaneously in response to rotation of an encoded wheel or tape within an optical sensor, as described above. The signals on lines 126a and 126b represent pulses generated when a wheel or tape of the encoder is detected at an incremental position, as is well known to those skilled in the art.

Encoder signals A and B are initially sent through a digital filter 120 that compares the past three samples of the incoming signal. A filtered signal is only allowed to transition from low to high or from high to low if the last three samples unanimously agree (i.e., are all 1's or all 0's). This filtering rejects spurious signals that can result in gained or lost encoder counts. An example of a circuit that can be utilized as filter 120 is described with respect to FIG. 9.

The filtered signals A and B are output from filter 120 and input to quadrature module 122, which includes a decode and position counter. Quadrature module 122 keeps a count of pulses produced by either channel as an indication of incremental motion of the wheel or tape, which indicates the position of the user object 66 in a degree of freedom. By comparing the pulses on both channels, the direction of motion of the user object can also be determined. This method of tracking an encoded wheel using two channels (A and B) is well known in the prior art and is typically called quadrature decoding. Quadrature decoding is often performed by a discrete IC such as an HCTL-2016 from Hewlett Packard. In the present invention, the quadrature functionality is included within the haptic accelerator 60 to reduce the cost associated with a discrete IC. An example of circuitry suitable to be used as quadrature module 122 is described with reference to FIG. 10.

Quadrature module 122 outputs position data determined from the signals A and B to a multiplexer 136, which multiplexes the position data with velocity and acceleration data as described below.

Motion processing module 124 also receives the dual signals A and B from filter 120 and provides velocity and/or acceleration processing for the filtered sensor signals. The velocity and acceleration function uses the same types of counters, latches, and flip-flops that are used in the quadrature module, but in a different way. Module 124 includes logic 128 to receive the A and B signals, to decode the direction of the movement of the user object, to detect the edge of the signals, and to prevent faults. Counter 130 is used to count the time that has elapsed since the last encoder pulse. This value is then latched by latch 132, which provide a very clean signal that is inversely proportional to velocity of the user object (the faster the sensor motion, the smaller the time interval between encoder ticks). A subsequent time interval can be latched by latch 134, and the change between these two time intervals provides an indication of acceleration of the user object. In alternate embodiments, more than two successive time intervals can be measured in order to provide averaged data that may be cleaner than when using only two values. Such measuring of multiple values does not require the typical host processor or local processor burden of measuring multiple samples and additionally filtering the signals.

For example, velocity can be obtained using the relationship v=ΔX/count(i), where ΔX is a constant equal to the encoder resolution. Acceleration can be obtained using the relationship, $$a = \frac{2\Delta X[1/count(i) - 1/count(i-1)]}{[count(i) + count(i-1)]}$$

The motion processing module 124 can use the same oscillating clock that is used by the quadrature module 122 (described below). Post-processing of the velocity and acceleration signals (for example, inverting the count value output by latch 132 to obtain a direct indication of velocity) can either be accomplished on the local microprocessor, on the host processor, or directly on advanced haptic accelerator 60″. A circuit suitable for use as the motion processing module 124 is described with reference to FIG. 11.

Figure 9:
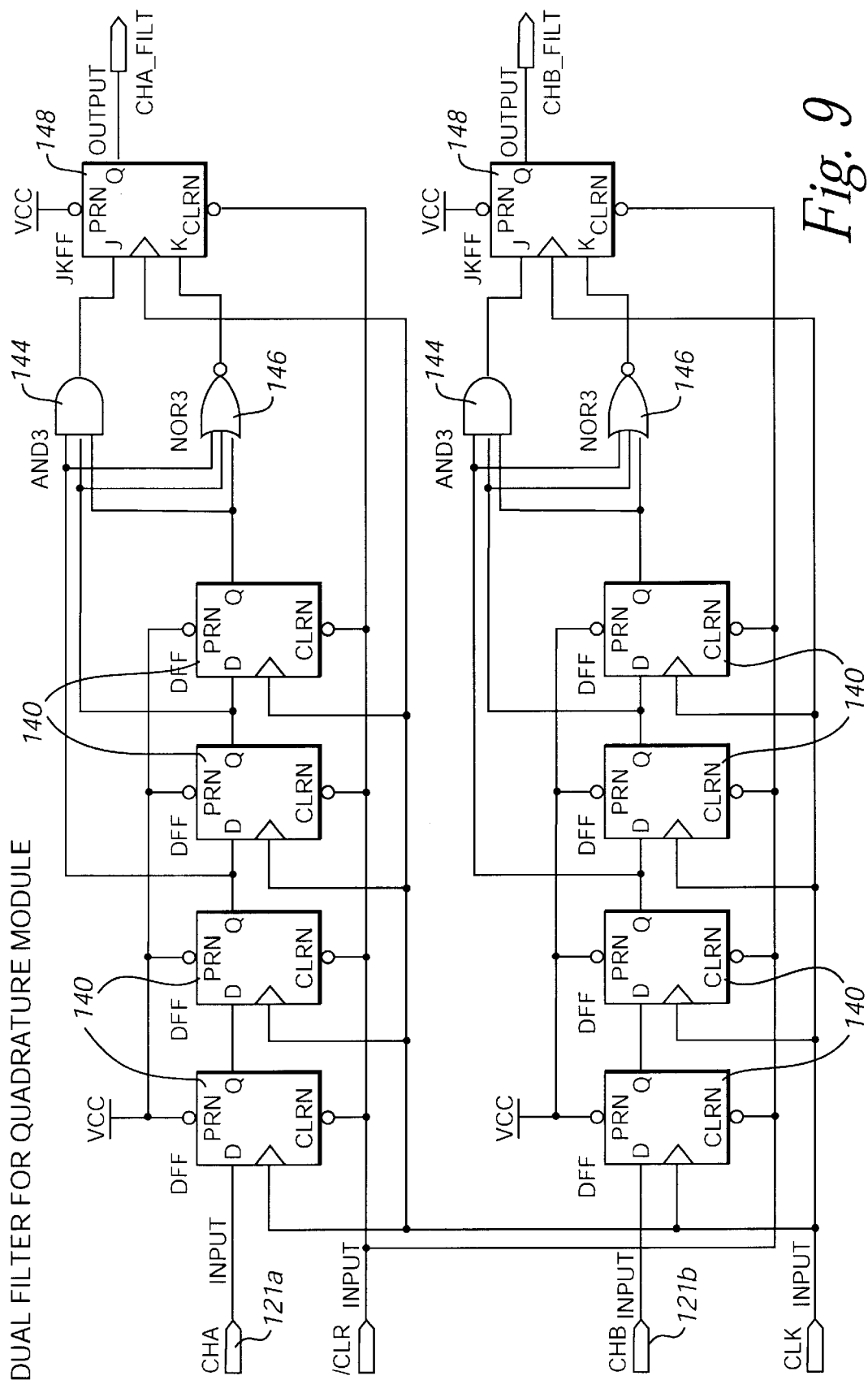
FIG. 9 is a schematic diagram illustrating an embodiment of the filter of the haptic accelerator of FIG. 8.

FIG. 9 is a schematic diagram illustrating an embodiment of the filter 120 of the haptic accelerator 60 shown in FIG. 8. Signal A on channel 121a and signal B in channel 121b are treated identically in the filtering process. A signal A or B is latched by one of D-flip flops 140. Flip-flops 140 store three successive signals according to the clock input and output the three successive values to AND gate 144 and NOR gate 146. Flip-flop 148 receives the outputs from gates 144 and 146 and outputs a high signal if the three successive values are all high values. The circuit of FIG. 9 can also be simplified if desired by eliminating the first flip-flop on each channel, and by using an XNOR gate on each channel instead of an AND gate and a NOR gate. The output signals are output to the quadrature circuit 122 and motion processing module 124 as shown in FIG. 8.

Figure 10B:
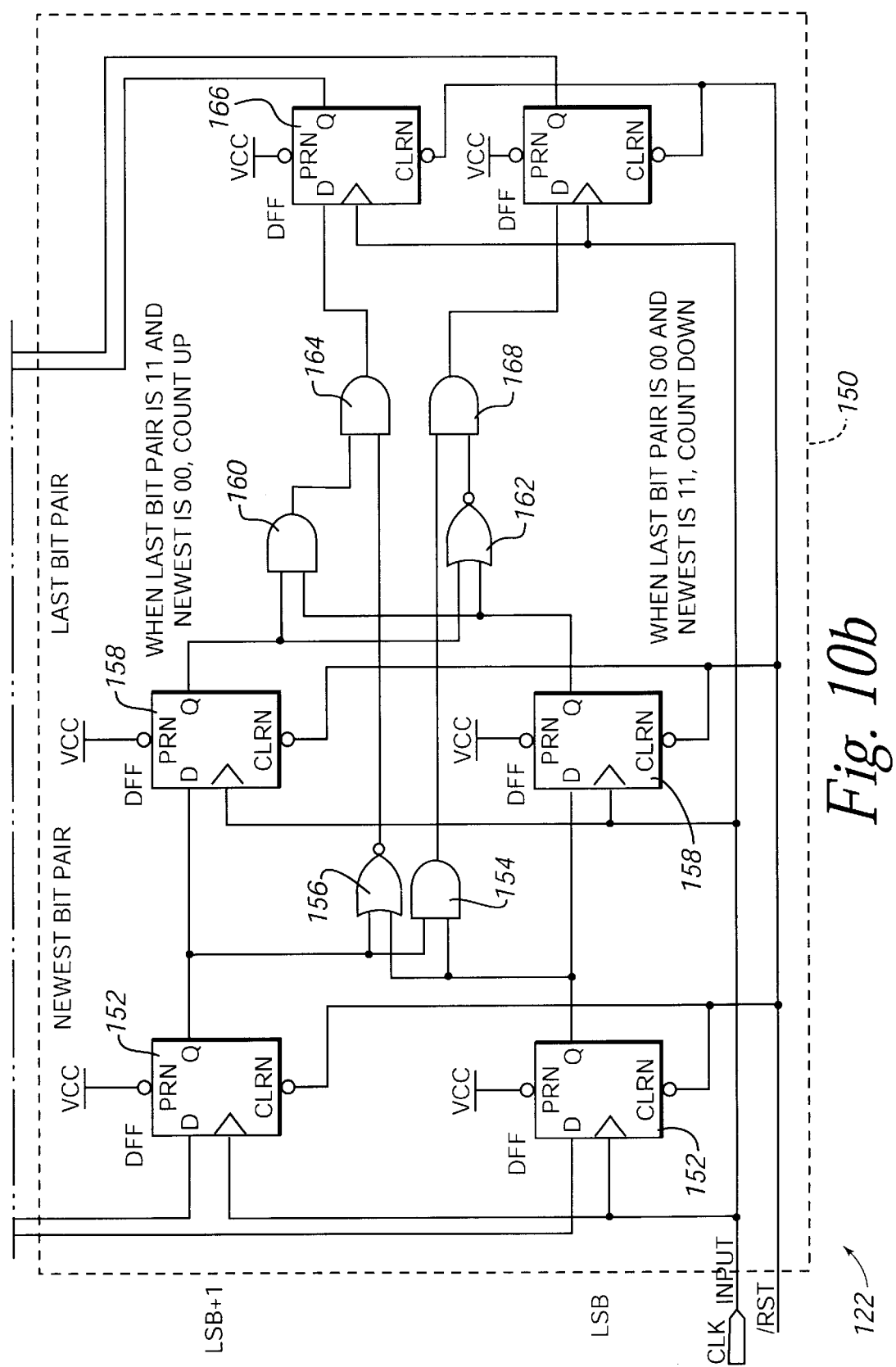
FIG. 10 is a schematic diagram illustrating a quadrature module of the haptic accelerator of FIG. 8.

FIG. 10 is a schematic diagram illustrating the quadrature module 122 of FIG. 8. The quadrature module receives filtered signals A and B. The portion 150 of the circuit determines the direction in which the encoder/user object is moving. The first flip-flops 152 and gates 154 and 156 retrieve the newest bit pair from the signals A and B. The second set of flip-flops 158 and gates 160 and 162 store the last bit pair that was previously input on signals A and B. AND gate 164 outputs a high signal when the last bit pair is 11 and the newest bit pair is 00; this instructs the flip-flop 166 to output a high value, indicating to the counter 175 to count up since the sensor is moving in the direction corresponding to counting up. AND gate 168 outputs a high signal when the last bit pair is 00 and the newest bit pair is 11, thus instructing flip-flop 170 to output a signal to instruct counter 175 to count down since the sensor is being moved in the direction associated with counting down. In alternate embodiments, the six flip-flop direction decode circuit can be simplified to use only one D-type flip-flop with one signal on the input and one signal on the clock.

The portion 172 of the circuit keeps a count that matches the changing position of the encoder/user object from the time the encoder was initialized. The XOR gate 174 operates on the A and B signals to provide the least significant bit of the count. The next bit is provided by signal B directly, and all subsequent bits are provided by counter 175. The direction-decode circuitry in portion 150 provides a pulse that causes the counter to increment or decrement when appropriate, as explained above. The value of the counter 175 is output to a latch 176 that holds a stable value that can be read by the host CPU or another external device. Latch 176 is controlled by a latch inhibit logic subcircuit 177, which releases the latch when the enable of AND gate 178 goes high and a low byte has been accessed as indicated by a high output from flip-flop 180 The subciruit 177 set the latch when a high byte is requested. The high and low bytes of the latch are multiplexed by a multiplexer 182 so that a number larger than the bus width can be separated into parts and placed on the data bus 183. The data bus 183 is routed to multiplexer 136 as shown in FIG. 11.

Figures 11, 11A:
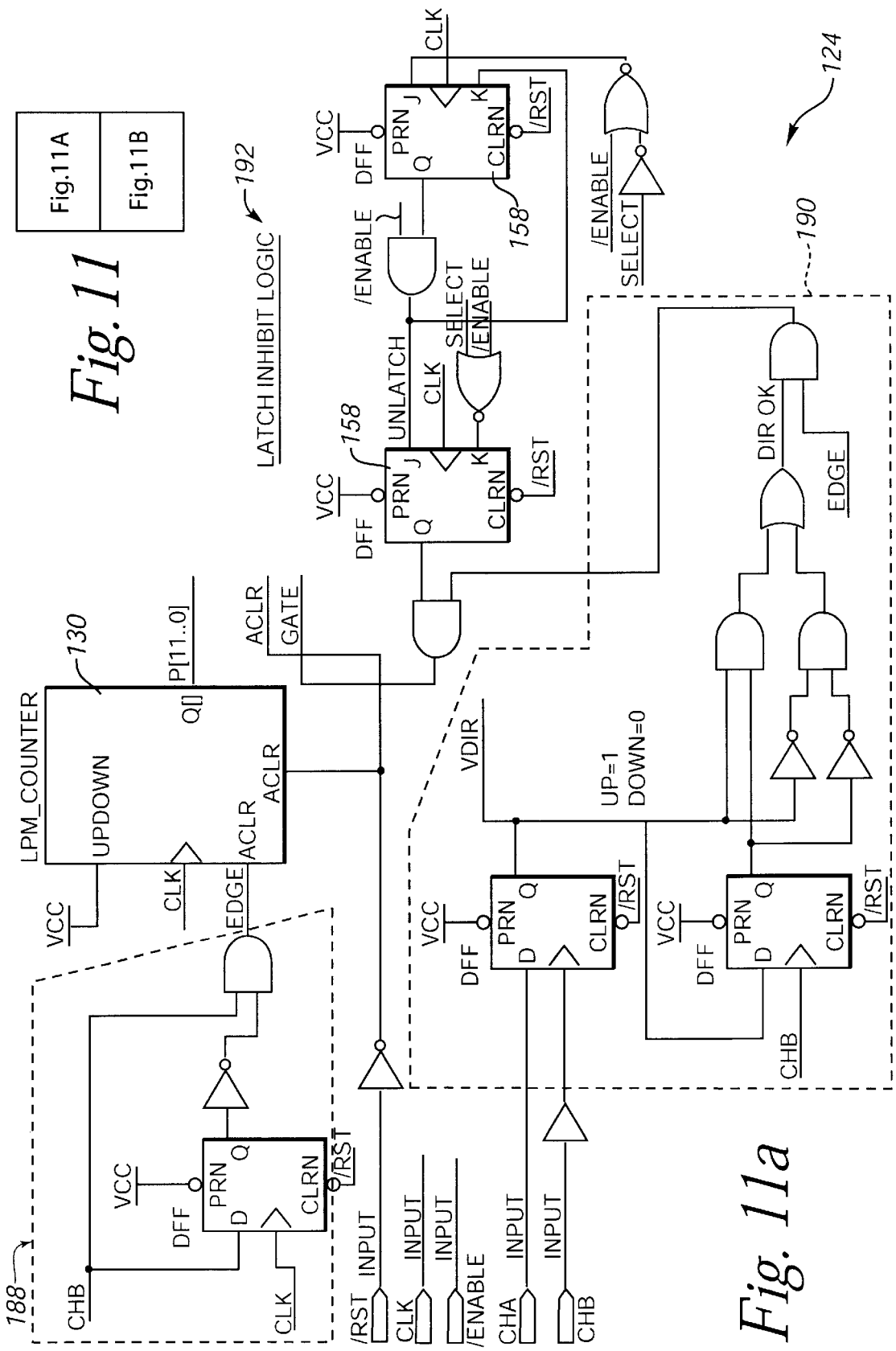
FIG. 11 is a schematic diagram illustrating a motion processing module of the haptic accelerator of FIG. 8.
Figure 11B:
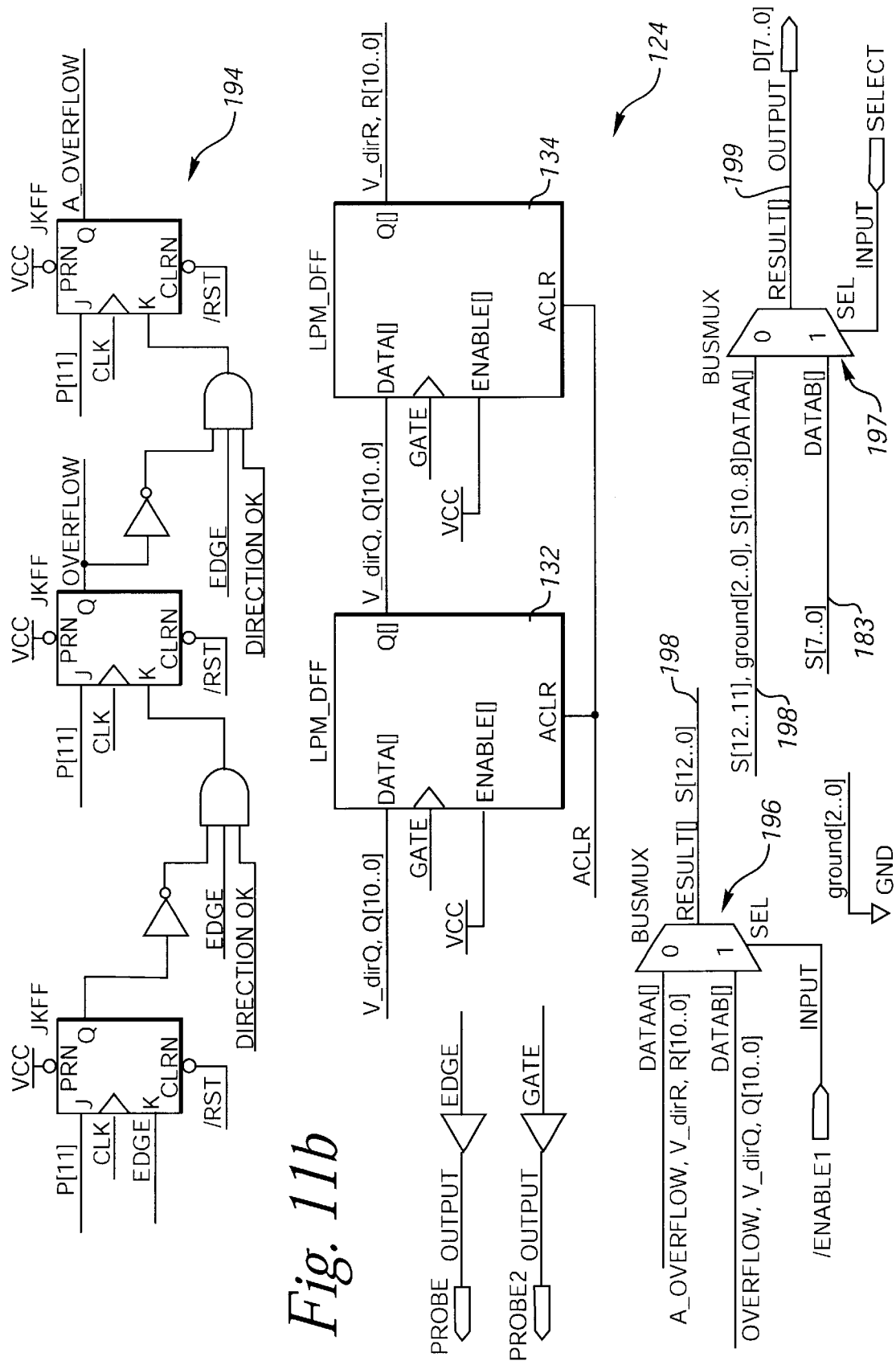

FIG. 11 is a schematic diagram illustrating the motion processing module 124 shown in FIG. 8. Module 124 is a circuit that is preferably programmed into the custom integrated circuit in which haptic accelerator 60 is implemented. The signal B from the filter 120 is input to an edge detection circuit 188 that provides an edge indicator pulse each time there is a rising edge on channel B. The edge indicator pulse in input to counter 130 (also shown in FIG. 8), that is triggered to count by the rising edges of the B signal such that a new count starts each time the B signal rises.

The counter 130 is coupled to latch 132 and loads a counter value into latch 132 if two conditions are met. First, the last two states of the B signal must be both up or both down, as detected by the direction decode circuit 190. Second, the latch inhibit logic 192 must not be indicating that a read is presently occurring. These two conditions are checked as a fault prevention function. If these conditions are met, the next time the B signal rises (with a new value), the previous counter value is loaded from counter 130 into a latch 132 that is coupled to the output of counter 130, and a new count is begun by counter 130. Concurrently, the old latched value is shifted to the right, from latch 132 into another latch 134. When an external device queries the haptic accelerator, both of these counts are available on output bus 199. Only one count need be used to indicate velocity, and can be the count value from latch 132 or latch 134 (a velocity based on the new count is obtained from the latch 132 count value, and a velocity based on the old count is obtained from latch 134 count value). At least two of the count values must be used to derive an acceleration. In one embodiment, acceleration may be determined by inverting both counts, taking the difference of those two values, dividing the quantity by the most recent count, and multiplying by the position resolution of the optical encoder.

An important feature of the present invention that allows accurate data to be input and output is the dedicated circuits 188, 190, 192, and 194 used for trapping errors and invalid signals. For example, if the encoder changes direction in the middle of an interval count, that interval will be invalid. Fault prevention logic, including direction decode circuit 190 and latch inhibit logic 192, makes sure that a count is latched only if the last two encoder pulses have been in the same direction and if a read is not occurring. Latch inhibit logic 192 is similar in structure and function to the latch inhibit logic 177 of FIG. 10. Another potential problem is overflow of the time counter that occurs if the encoder is moving too slowly and the counter reaches its maximum value before the next encoder pulse arrives. The three-flip-flop state machine 194 makes sure that a velocity overflow flag and acceleration overflow flag are set as soon as overflow occurs. In order for the velocity flag to be reset, two successive encoder pulses must occur in the same direction, without overflow. In order for the acceleration flag to be reset, the conditions for resetting the velocity flag must be met twice.

The outputs from the latches 132 and 134 are augmented with the outputs from the state machine 194 and are multiplexed by multiplexer 196 onto a parallel data bus 198. Data on bus 198 and bus 183 is then multiplexed onto bus 199 by multiplexer 197, and bus 199 is coupled to the microprocessor 54 as shown in FIG. 3. In an embodiment such as the one in FIG. 7, where the haptic accelerator is used directly with the host computer, data bus 199 can be coupled to the host data bus via the card interface electronics 102 shown in FIG. 7.

In other embodiments, alternative circuits structures can be provided for motion processing module 124. For example, additional filters can be provided (although the signals are prefiltered by the same digital filter 120), or counter 130 can be provided with an increased count capability such that the counter only latches count values after more than one encoder pulse has gone by; for example, the counter can count values every 5 encoder pulses to measure the time between 5 pulses. The time is then divided by 5 to achieve an average time between pulses. Increasing the clock speed applied to the counter will increase time resolution, resulting in increased velocity and acceleration resolution, as well as the ability to deal with faster velocities, though it may require a larger counter and latches. Increasing the counter and latch size enables one to deal with smaller velocities. Further improvements such as the implementation of adders, multipliers, dividers, table lookup, etc., can be included in the embodiment of the advanced embodiment of the haptic accelerator chip.

Figure 12:
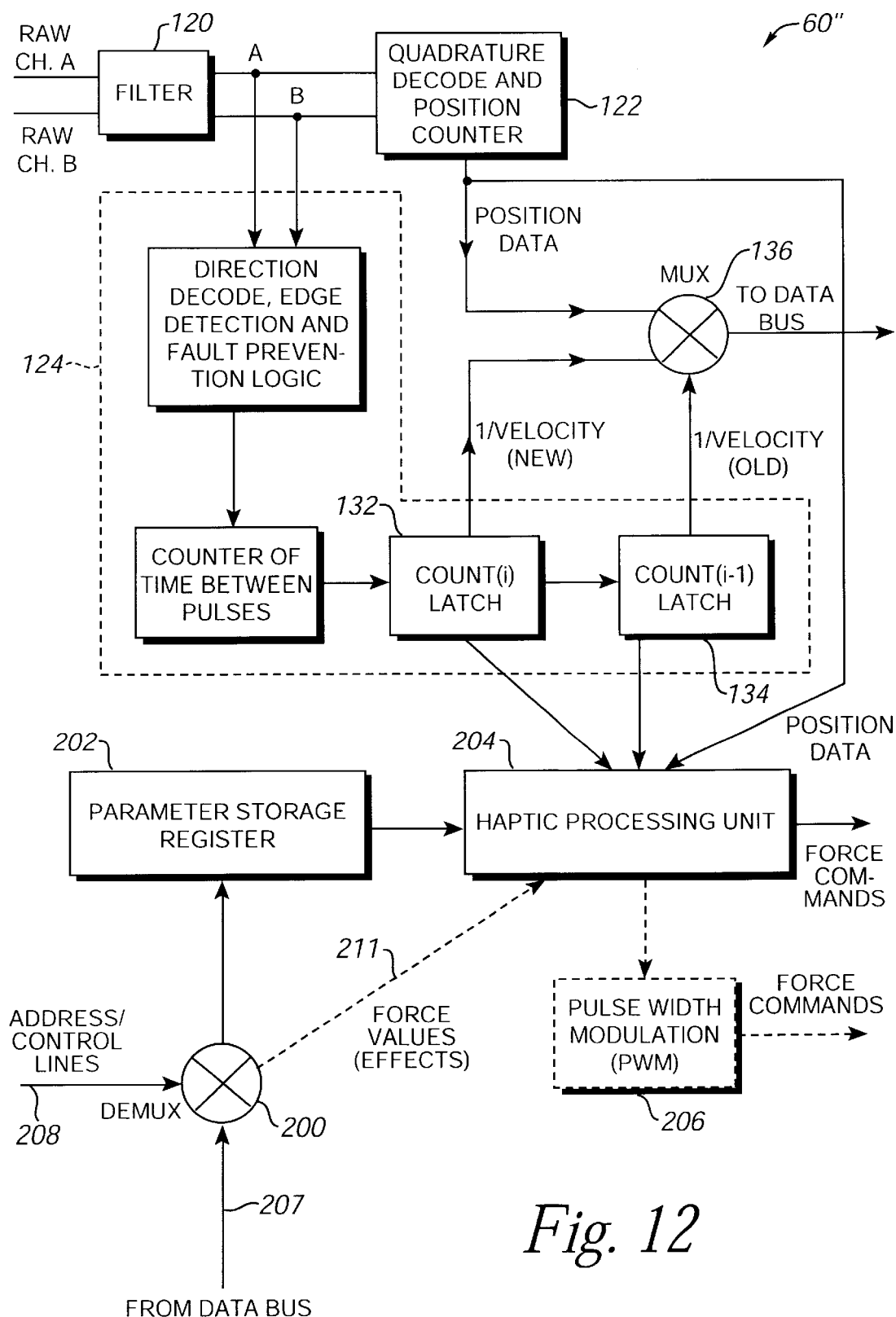
FIG. 12 is a block diagram illustrating an example of the advanced haptic accelerator of FIG. 5.

FIG. 12 is a block diagram illustrating an example of the advanced haptic accelerator 60" described above with reference to FIG. 5. Accelerator 60" includes a filter 120, a quadrature decode and position counter 122, a motion processing module 124, and a multiplexer 136 substantially similar to the equivalent components described above with reference to FIG. 8 for accelerator 60'. In addition, accelerator 60" includes a demultiplexer 200, a parameter storage register 202, a haptic processing unit 204, and an optional pulse width modulation block 206.

Demultiplexer 200 receives data from data bus 207 from the microprocessor 54, including constants and parameters for condition forces. Input parameters are sent via bus 209 to parameter storage register 202. Address and control lines 208 are used by local microprocessor 54 (or host CPU 38) to enable the demultiplexer to write parameters to parameter storage register 202, which stores the parameters so that the haptic processing unit 204 may access the parameters when appropriate. The condition parameters preferably include positive and negative stiffness (+k, −k), positive and negative damping (+b, −b), mass (m), positive and negative saturation (+sat, −sat), deadband size (db), and location offset (offset). Preferably, only one set of any of the parameter values can be stored at one time, so that the haptic processing unit 204 may retrieve only one set of each type of parameter. Alternatively, multiple sets of parameters can be stored in the parameter storage register for the haptic processing unit to retrieve simultaneously and use to compute simultaneous (summed or overlaid) condition forces, such as a spring force and a damping force or two spring forces having different k values. In yet other embodiments, multiple sets of parameters might be stored and the HPU can select the proper parameter set to use for a particular condition force.

The parameter values in register 202 are accessible to the haptic processing unit 204, which uses the parameters to weight determinations of condition force values which are proportional to the desired output actuator force. The haptic processing unit is preferably a circuit implemented on the haptic accelerator chip (FPGA, ASIC, etc.) The haptic processing unit 204 uses on-board force algorithms to compute output condition forces, as explained above with reference to FIG. 5. In alternate embodiments, other condition forces such as friction and texture can be provided by the haptic processing unit using similar parameters and on-board algorithms. The method by which the haptic processing unit 204 operates is described in greater detail with respect to FIG. 13.

The demultiplexer 200, in some embodiments, also separates out force values from microprocessor 54 that represent force effects and sends the force effect values to haptic processing unit 204 on line 211. The force effects can be summed with force conditions determined by the HPU, as detailed below. Alternatively, microprocessor 54 can send the force effect values directly to an actuator or to a different circuit for the summation of conditions and effects, or the microprocessor 54 can do the summation itself.

Some actuator amplifiers or control circuitry require a pulse-width modulated (PWM) signal. To control an actuator amplifier that requires a PWM signal, the haptic accelerator can optionally include on-board PWM capability in the form of PWM block 206. Block 206 can receive a signal represented as a binary number and convert it to at least two pulse streams per actuator and 2 to 4 control lines for H-bridge electronics (to drive motor in both directions) as is well known. The "on" time of the pulse stream can be proportional to the desired force (or velocity) of the actuator, as is well known to those skilled in the art.

Figure 13:
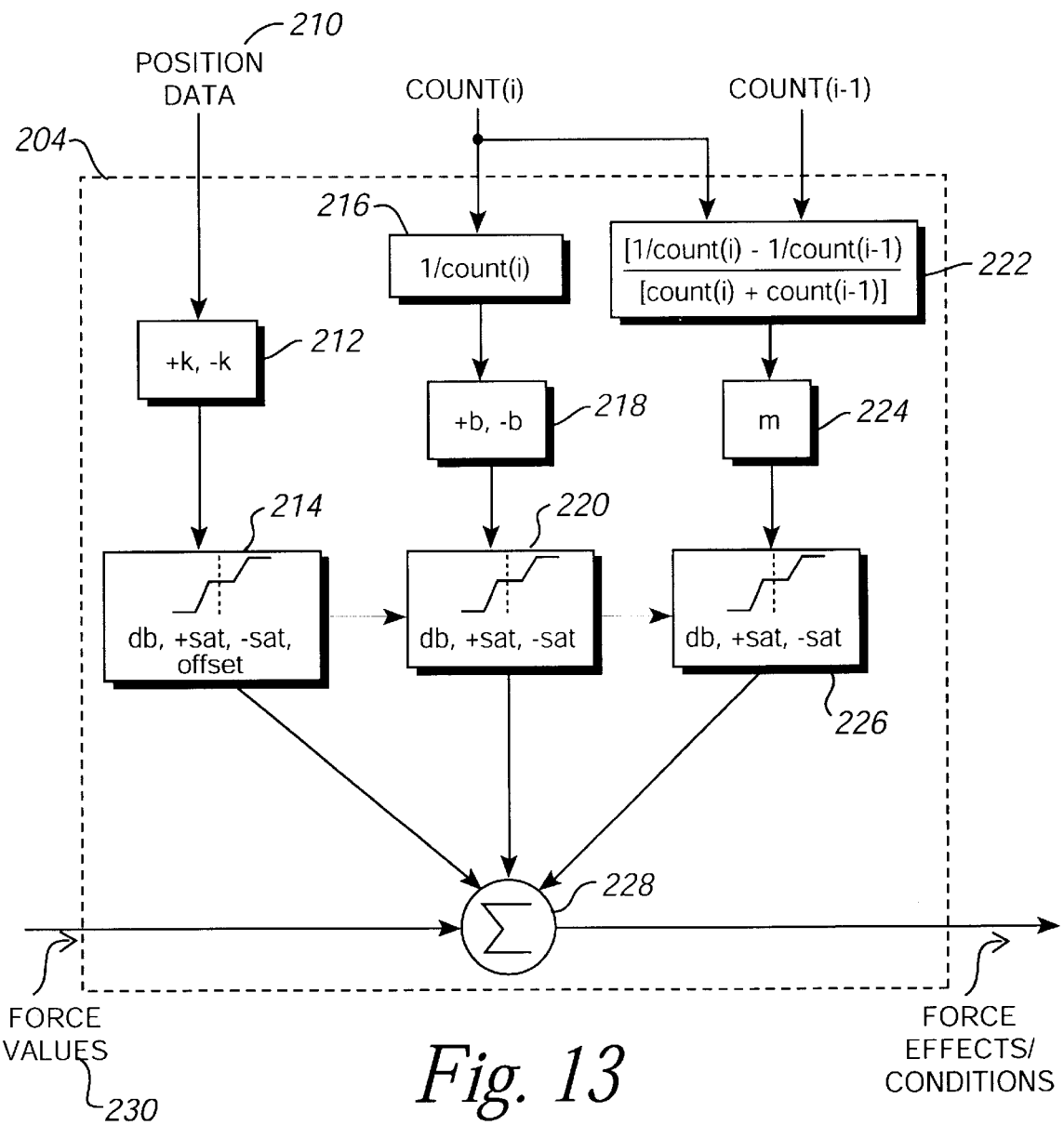
FIG. 13 is a flow diagram of a process in which the haptic processing unit of FIG. 12 determines condition forces.

FIG. 13 is a flow diagram of a process whereby haptic processing unit 204 of FIG. 12 determines condition forces.

Circuits to implement the described mathematical operations are well known to those skilled in the art. The haptic processing unit 204 receives position data 210 from the quadrature module122 shown in FIG. 12. The position data is used to calculate stiffness forces or "restoring" forces which are forces that are proportional to an offset distance from an origin position of the user manipulatable object. Such forces are typically determined using the relationship F=kx, as described above. Thus, in step 212, the haptic processing unit retrieves k parameter values from the parameter storage register 202. In step 214, the haptic processor optionally retrieves parameters to further specify the restoring force, such as deadband (db), positive/negative saturation (+sat, −sat), and offset parameters.

Figure 14:
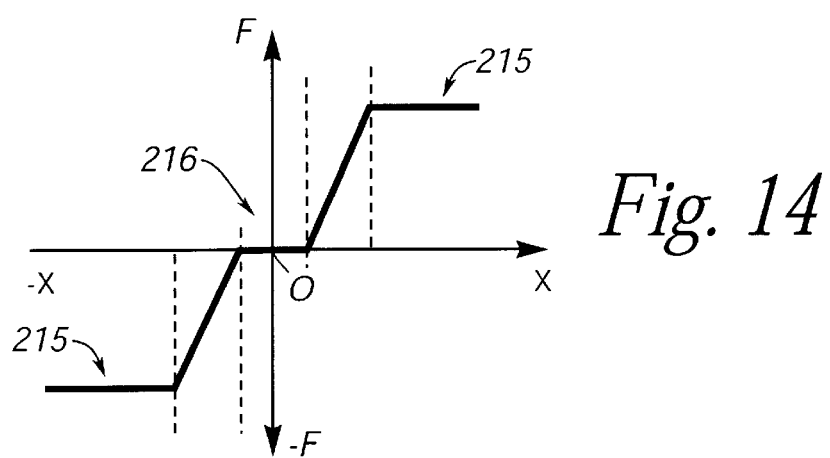
FIG. 14 is a graph of a stiffness force with reference to position versus force output.

FIG. 14 shows a graph relationship of a stiffness force with reference to position (x) versus force output (F). The stiffness force parameters described in step 214 modify the force condition at different distances from an origin point O. A stiffness force is a linear force vs. displacement relationship. The stiffness force increases in magnitude the further the object is moved from the local origin O, and is applied in a direction opposing the deviation of the user object from the local origin. A stiffness force can be described as a "spring return", since it feels to the user as if a strong spring resists displacement of the user object away from the local origin O. In the described example, the stiffness force can be modeled using Hooke's Law, where resistance force F is proportional to the displacement or deviation x. X is the deviation along an axis or degree of freedom (−x indicates an opposite direction to +x) and k is a spring constant defining the magnitude of force. In other embodiments, a stiffness force can be modeled with an exponential stiffness or other relationship rather than linear stiffness.

Also, as shown in FIG. 14, a saturation region 215 can be provided as defined by the parameters +sat and −sat, where the magnitude of force generally remains constant when the user object is moved past the distance specified by the saturation parameters. Positive and/or negative saturation regions can be defined for each degree of freedom. In some embodiments, the saturation force magnitude can be limited to a predetermined percentage of the maximum possible output force in a the selected degree of freedom, so that effect (or "overlay") forces can be overlaid on top of the restoring force sensation or other condition. In other embodiments, impulse shaping can perform this limiting function, as described in co-pending application Ser. No. 08/747,841, filed Nov. 13, 1996 by Rosenberg et al. and incorporated by reference herein.

A deadband region 216 can also be provided as defined by the parameter db, which defines a deadband distance. The deadband is a region centered about the origin O in which forces are zero. The deadband facilitates movement of the user manipulatable object 66 about a center position without feeling the restrictive restoring force. The deadband can be offset from the origin O using the offset parameter, which specifies a positive or negative offset distance.

The described parameters may or may not be used, or may be used only partially, such as in a single direction of a degree of freedom. Referring back to FIG. 13, the processing unit 204 determines the restoring condition force using the retrieved parameters at a summing node 228, and sums the result with other forces as described below.

The haptic processing unit 204 also receives the count(i) value from the latch 132 of the motion processing module 124 to determine a damping condition and other velocity-related conditions. In step 216, the haptic processing unit reciprocates the count(i) value to obtain a current velocity of the user manipulatable object. It should be noted that the HPU may instead obtain a one-count older velocity value by reciprocating the count(i−1) value instead of the count(i) value, and use the older velocity value in the damping condition determination. In step 218, the HPU retrieves damping parameters −b and +b from the parameter storage register 202 in order to determine a damping condition force. The damping parameters are used similarly to the k parameters described above, but in a F=bv or similar relationship. In step 220, the haptic processing unit retrieves other applicable parameters to determine the damping force, such as deadband and saturation parameters. These parameters can modify the damping force similarly to the stiffness force shown in FIG. 14. Typically, an offset parameter is not used for a damping force for stability reasons.

The damping condition force is then determined based on the velocity of the user manipulatable object and the damping parameters at a summing node 228, and the resulting damping force is summed with other forces as described below.

The haptic processing unit 204 also receives the count(i−1) value from latch 134 of the module 124 to determine, in conjunction with the count(i) value, an intertia condition and/or other acceleration-related force. In step 222, the haptic processing unit performs a calculation to determine acceleration using count(i) and count(i−1), as described above. In step 224, the HPU retrieves a mass parameter m from the parameter storage register in order to determine an inertia force. Other types of parameters that can be used in acceleration-related forces can also be retrieved. In step 226, other characterizing types of parameters may be retrieved, such as deadband and saturation parameters as described above. An inertia condition force or other type of force is then determined based on the acceleration of the user object 66 and retrieved parameters and is summed with other forces as described below.

Summing node 228 performs a summation of all the condition forces determined in the above steps by haptic processing unit 204. For example, both a stiffness force and a damping force might be desired condition forces that the application programmer desires to be output simultaneously to the user. The haptic processing unit 204 would determine the stiffness force and the damping force values separately, then sum them at node 228. The resulting summed force value is then sent out to the actuators or actuator control circuitry.

Optionally, time-varying force values 230 for implementing force effects or overlays (or other types of force values) can be routed to the haptic processing unit 204 on line 211 shown in FIG. 12. The local microprocessor 54 (or host 32) preferably determines the force effects. The effects can be input to the summing node 228 and can be summed with the condition force values determined by the haptic processing unit, and the total summed force values are then sent to the actuators 64. This allows the actuators 64 to be controlled by the haptic accelerator 60 without further involvement from a microcontroller or microprocessor 54. In an alternative embodiment, the microprocessor 54 or other controller can send effect forces separately to the actuators simultaneously with the haptic accelerator sending condition force values to the actuators.

Summing node 228 is shown implemented within the haptic accelerator 60, but the summing function can alternatively be performed by microprocessor 54 or by a separate summing circuit. A separate summing circuit can be implemented as, for example, an operational amplifier in a well-known summing configuration (for an analog embodiment). If the microprocessor 54 performs the summing, the haptic processing unit would send any computed condition forces to the microprocessor, and the microprocessor would sum those conditions with any computed effect forces and output the result to the actuators. One advantage of performing the summing on the microprocessor is that the microprocessor can handle complicated situations in which some "intelligence" is required. For example, if the magnitude sent to the actuators must be limited to a value of 100, and five forces of magnitude 30 must be summed, then some forces might take precedence over others, some forces might be limited more than others, or other actions might be necessary to limit the total force magnitude yet retain a high-fidelity force sensation for the user. The microprocessor 54 is often better suited to handle such complications than haptic processor 60. However, summing performed by the haptic accelerator is typically faster and offloads 30 computational burden from the microprocessor.

The above haptic accelerator embodiments assume that a digital sensor such as an optical encoder is used for sensors 62. However, all of the above concepts can be used with analog sensors such as potentiometers. In the case of potentiometers, an analog to digital converter (ADC) can be coupled to the analog output of the potentiometers and the resulting digital bits can be processed by the haptic accelerator 60. For example, the least significant bits from the ADC output can be used as the pulse that triggers the timers or counters of the quadrature decode counter 122 and motion processing module 124. The two least significant bits can be used to obtain the direction of the sensor and user manipulatable object. These components would replace the A and B encoder channels and related components.

Although the haptic accelerator 60 may be implemented as a stand alone chip, it may also be implemented on the same piece of silicon (or other substrate) as the local microprocessor 54. A custom ASIC can be provided with a microprocessor 54 core that runs in parallel with the discrete logic for the haptic accelerator 60. The advantage to having a single chip is that the same functionality can be produced at a significantly lower cost in volume for the mass consumer market.

Figure 15:
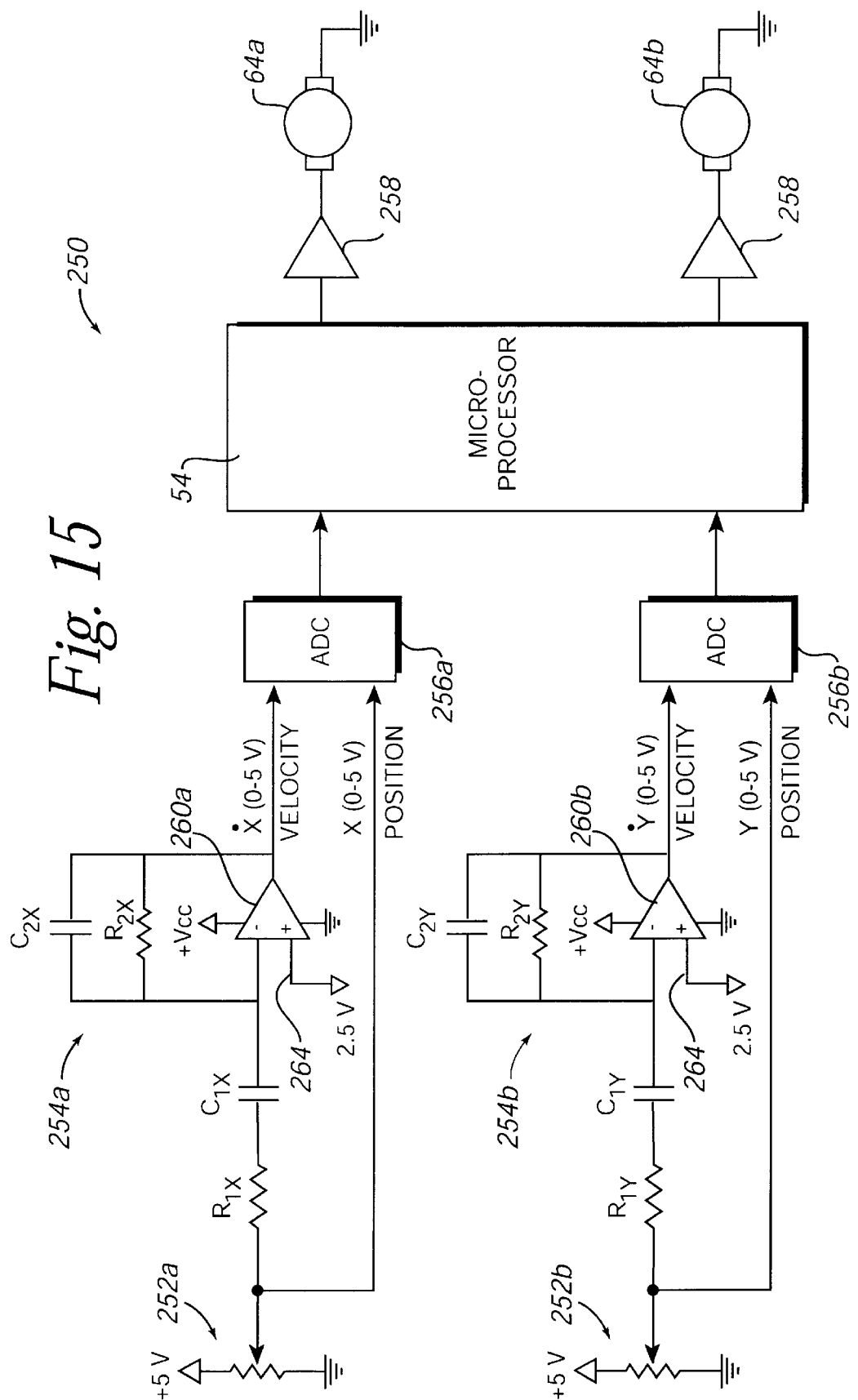
FIG. 15 is a schematic diagram of an alternate analog circuit embodiment of the haptic accelerator of FIG. 3.

FIG. 15 is a schematic diagram of an alternate circuit embodiment 250 of haptic accelerator 60. In this embodiment, an analog circuit is used to determine velocity of the user manipulatable object 66. Acceleration of the user manipulatable object can also be determined utilizing a similar analog circuit 250.

Circuit 250 includes analog position sensors 252, analog differentiator 254, and analog to digital converter (ADC) 256. Position sensors 252 function as sensors 64 in the interface device, and are shown as analog potentiometers. Other types of analog sensors can also be used. A two-degree-of-freedom circuit is shown, where an x-axis sensor 252a determines position along an x-axis, and a y-axis sensor 252b determines position along a y-axis.

Analog differentiator 254 includes two subcircuits, each subcircuit coupled to one of the analog sensors 252. The differentiator converts the analog position signal from sensors 252 into an analog velocity signal $V_{out}$. For example, in the example embodiment shown, the output potentiometer voltage range from 0 to 5 volts. This sensor voltage is input to an operational amplifier 260. The output voltage of the op amp is proportional to the resistance value R of resistor R2 and the capacitance value C of capacitor C1, as shown by the relationship $V_{out}=-RC\,(dV_{in}/dt)$. When the inverting input 264 to the op amp 260 is biased to 2.5 volts, the resulting output is offset, yielding $V_{out}=2.5\text{ v }-/+RC\,(dV_{in}/dt)$. The values R and C of the resistor R2 and the capacitor C1 are then chosen to produce a 2.5 volt signal at the maximum expected velocity of user manipulatable object 66. For example, suitable values are R=470 K-ohm and C=0.33 uF, yielding a gain of about 0.15. This would produce an output velocity signal of 1 volt for a full scale voltage change in the potentiometer output in one half of a second (Vout=2.5−0.15*(5/0.5)). The values of resistor R1 and capacitor C2 are chosen as to effectuate a low pass filter, as is well known in the art.

The output velocity signals from the subcircuits of the differentiator 254 are then provided to a ADC 256a or 256b. ADC's 256 convert the velocity signals to digital signals suitable for input to local microprocessor 54, ADC's 256 also convert the analog position signals from potentiometers 252 to digital signals and input the digital signals to microprocessor 54. ADC's 256 can be provided as separate components, or can be included within microprocessor 54. In alternate embodiments, ADC's 256 can be implemented as other equivalent circuits, such as counter circuits or one shots devices, as is well known to those skilled in the art.

Local microprocessor 54 uses the velocity signals to determine a force dependent on velocity, such as a damping force described above. The position signals are used to determine a stiffness force or other types of forces as described above. The damping force and any other forces are then summed and the total force magnitude is output to optional power electronics (actuator interface) 258 and then to the actuators 64, which output the force on the user object 66.

The acceleration of user manipulatable object 66 can also be provided by analog circuit 250 so that inertias and other acceleration-related forces may be determined. A second differentiator circuit, substantially similar to differentiators 254, can be included to receive the velocity outputs from differentiator 254 and differentiate the velocity signals to achieve acceleration signals. The R and C values can also be similar to the values used in differentiator 254. The acceleration signal output from such a circuit can be input to microprocessor 54 similarly to the velocity outputs from differentiators 254 so that the microprocessor may determine inertia forces and other acceleration-dependent forces.

In an alternate embodiment, a second microprocessor can be used in addition to microprocessor 54 to receive the velocity and/or acceleration signals and calculate and output condition forces, leaving the control of effect forces to microprocessor 54. Preferably, such a second microprocessor would be an inexpensive processor, since a fast, powerful microprocessor is unnecessary for such condition force determination and control.

In yet another embodiment, the analog circuit 250 can be used in conjunction with functionality of the advanced haptic accelerator 60". For example, the analog sensors 252 and differentiators 254 can provide analog positions and velocities (and accelerations) to ADC's 256, which convert the analog signals to digital values and input the digital values to haptic processing unit 204. The haptic processing unit uses the values to determine condition forces as described above.

Figure 16:
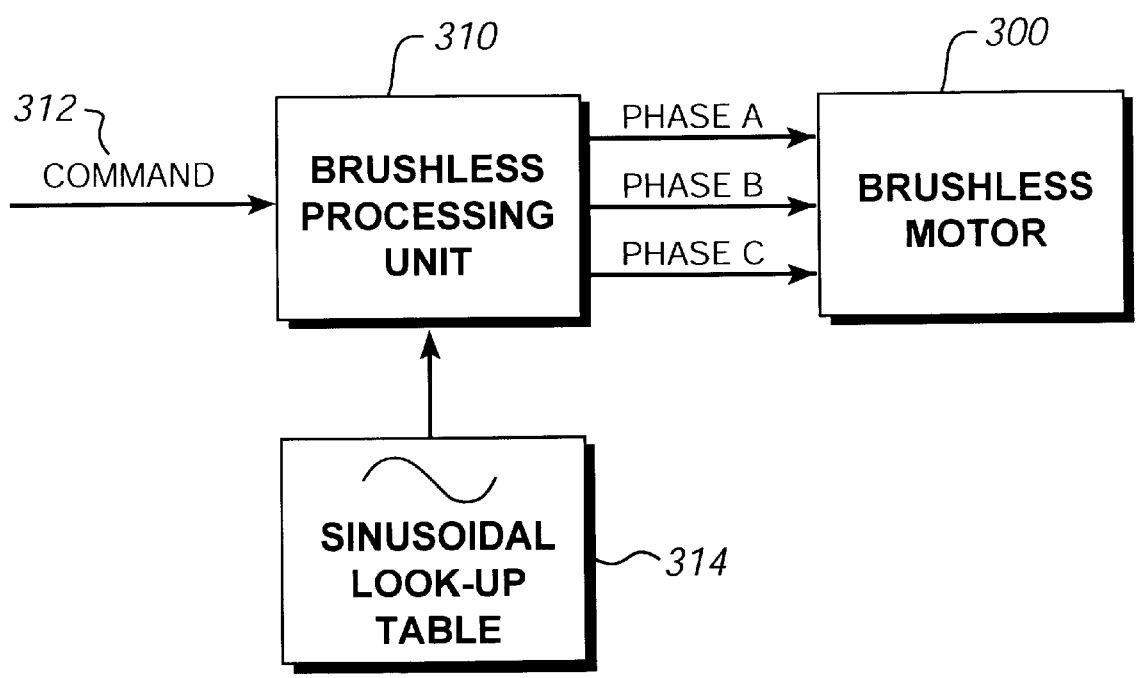
FIG. 16 is a block diagram of a control system of the present invention for controlling a brushless motor in a force feedback interface device.

FIG. 16 is a block diagram of a control system of the present invention for controlling a brushless motor in a force feedback interface device, and which is readily adapted for use with the haptic accelerator of the present invention.

Motor 300 is a DC brushless motor which can be used as actuator 64 to provide forces to the user object 66 as described above. Motor 300, as a brushless motor, includes wire windings wrapped around a housing or stator and magnets positioned within the stator to be used as a rotor that rotates within the stator. Brushless DC motors typically have either two or three windings. As is well known to those skilled in the art, current is induced in the windings to create an electromagnetic field and to cause the magnetic rotor to rotate.

Using a brushless motor 300 has several advantages over brush type DC motors, especially when applied to force feedback applications as described herein. Conventional brush-type DC motors have friction characteristics due to their brushes that limit performance and fidelity of generated forces. This friction can often be felt by a person using a haptic device; in these cases it would be valuable to eliminate such friction. Brushless motors, in contrast, operate with a much reduced amount of friction over brush-type motors.

Since brushless motors lack brushes to control the flow of current in the windings, alternating current must be commutated based upon knowledge of the position of the rotor. A common, simple way to obtain knowledge of the position of the rotor and thus control the brushless motor is by using a Hall effect sensor. The Hall effect sensors sense magnetic fields and can be used to sense the position of the rotor, thereby allowing a controller to induce current in an appropriate wire to drive the rotor. However, Hall effect sensors are crude devices such that only a vague sense of the position of the rotor may be sensed. For example, the space through which the rotor rotates is typically divided into a number of sectors, such as six, and the Hall effect sensor determines in which sector that a particular reference point on the rotor is current located. However, the crudeness of this sensing technique typically causes a "torque ripple" in which the torque output of the motor varies.

Due to the torque ripple caused by crude control using Hall effect sensors, brushless DC motors are not typically used in haptic or force feedback applications. However, the present invention provides precise rotor position sensing by using resolvers or optical encoders. Precise knowledge of the rotor position allows precise sinusoidal commutation of the current to the windings to be implemented, resulting in a very smooth torque output of the brushless motor. However, sinusoidal commutation has only traditionally been used in industries completely unrelated to force feedback interface devices for a user, such as aerospace industries, radar devices, research, etc. The sinusoidal commutation of brushless motors as in the present invention is applied to force feedback interface systems, where the smooth torque output is crucial to the performance of an interface device.

Sinusoidal commutation of a brushless motor can be implemented using well-known circuits. For example, a brushless servo motor control chipset MC1231A is offered by Performance Motion Devices for providing sinusoidal commutation to a brushless motor. Other types of control circuits can also be used.

A brushless processing unit 310 is shown in FIG. 16. The processing unit can include a control circuit for sinusoidal commutation, such as the PMD chipset described above. In addition, the digital integrated circuit technology and haptic accelerator 60 described herein can also be applied to or provided with sinusoidal brushless motor commutation for haptic feedback. For example, when controlling a three-phase brushless motor 300, the output stage described for the haptic accelerator can be tripled, either using digital output or pulse-width modulation (PWM). For example, a PWM block can be provided for each coil, so that three PWM blocks are used for each motor. Three H-bridges, 3 digital lines, and three pulse streams can be provided for each brushless motor.

Digital force commands 312 can be accepted by brushless processing unit 310 from the host computer 32 or microprocessor 54 instead of using a haptic processing unit (or in addition to using the HPU). The brushless processing unit (BPU) 310 is provided to determine sinusoidal waveforms for the different motor windings. In the preferred implementation, the sinusoidal waveform determination is performed using one or more lookup tables 314, which can be stored in memory on board the chip with the brushless processing unit, or on another chip local to the interface device 34. For example, a position of the rotor is provided to the BPU from command 312, and the BPU retrieves the entries in the look up table corresponding to the received position. The entries can be a number of values indicating the proportion of current to be output to the particular coils. Thus, for three-phase motor, three percentage values can be stored. Alternatively, the sinusoidal waveform can be generated by direct calculation if sufficient processing power exists on the haptic accelerator.

The sinusoidal commutation of haptic system motors of the present invention, combined with the haptic accelerator controller of the present invention, is important for the performance improvement it can bring to haptic devices, as well as for the cost savings. Substantial savings may result from placing the brushless motor control electronics on the haptic accelerator 60. Substantial savings may also result because the application of haptic feedback is fundamentally different from typical brushless motor applications. Haptic feedback devices usually command specific forces, rather than motion or velocities that are commanded in typical brushless motor applications. Brushless motors in haptic feedback devices also move at very slow speeds compared to typical brushless applications, so many of the electronics associated with making a general-purpose brushless motor controller can be discarded for substantial cost savings. For example, a force feedback motor may not spin at all if only a resistive force is desired to be applied to oppose the force imparted by the user on the user object. This is known as applying a force "at stall", since the motor shaft need not be moving to apply the resistive force. This is in contrast to previous brushless motor applications, which typically rotate or spin objects using the motor.

As with the haptic accelerator described above, the brushless motor controller can be implemented in a programmable logic device (PLD), field-programmable gate array (FPGA), some other programmable logic device, or an application specific integrated circuit (ASIC).

While this invention has been described in terms of several preferred embodiments, it is contemplated that alterations, permutations and equivalents thereof will become apparent to those skilled in the art upon a reading of the specification and study of the drawings. For example, many different types of forces and combinations of forces can be applied to the user object depending on the particular effect or condition desired. Also, many types of host application programs and force feedback interface devices can make use of the haptic accelerator functionality disclosed herein. Also, the haptic accelerator can be implemented in a wide variety of hardware forms. Furthermore, certain terminology has been used for the purposes of descriptive clarity, and not to limit the present invention. It is therefore intended that the following appended claims include all such alterations, permutations, and equivalents as fall within the true spirit and scope of the present invention.

What is claimed is:

1. A user interface device for use with a host computer displaying a graphical environment on a display device, said host computer displaying and updating said graphical environment in response to user manipulation of said interface device and commanding force feedback sensations in response to said user manipulation and in coordination with events within said graphical environment, the interface device comprising:

a user manipulatable object able to be physically contacted by a user and movable in a degree of freedom;

a sensor that tracks the motion of said user manipulatable object in said degree of freedom, said sensor outputting a sensor signal indicative of a position of said user manipulatable object in said degree of freedom;

an actuator for creating a tactile sensation to be felt by said user;

a local microprocessor separate from said host computer and coupled to said host computer, said local microprocessor reporting data to said host computer, said data based at least in part on said sensor signal, and said local microprocessor determining open loop forces to be output by said actuator based on at least one command sent from said host computer; and a second processor separate from said local microprocessor and from said host computer and coupled to said actuator, said second processor determining closed loop forces and controlling said actuator to output said closed loop forces to produce said tactile sensation in accordance with interactions in said graphical environment displayed on said host computer system, wherein said open loop forces and said closed loop forces are summed by said second processor to a total force to be output by said actuator.

2. A user interface device as recited in claim 1 wherein said closed loop forces include a spring sensation and a damping sensation.

3. A user interface device as recited in claim 1 wherein said second processor includes a haptic processing unit for determining said tactile sensation.

4. A user interface device as recited in claim 3 wherein said second processor receives parameters from said local microprocessor to determine said tactile sensation.

5. A user interface device as recited in claim 1 wherein said second processor receives said sensor signal from said sensor and determines a velocity of said user manipulatable object from said sensor signal.

6. A user interface device as recited in claim 1 wherein said second processor is a microprocessor.

7. A user interface device as recited in claim 1 wherein said second processor includes pulse width modulation (PWM) capability for driving said actuator.

8. A user interface device as recited in claim 1 wherein said second processor includes an analog circuit that provides analog positions and velocities of said user manipulatable object to a haptic processing unit of said second processor.

9. A method for outputting forces from a force feedback device, said force feedback device coupled to a host computer displaying a graphical environment on a display device, said host computer displaying and updating said graphical environment in response to user manipulation of said force feedback device and commanding force feedback sensations in response to said user manipulation and in coordination with events within said graphical environment, the method comprising:

receiving a sensor signal from a sensor of said force feedback device, said sensor signal indicative of a position of a user manipulatable object in a degree of freedom;

determining a position of said user manipulatable object from said sensor signal;

reporting said position to said host computer, said reporting performed by a first processor on said force feedback device, said first processor being separate from said host computer;

determining a closed loop force based on a command received by said force feedback device from said host computer to correlate said force with an event in said graphical environment, said determining a closed loop force being performed by a second processor on said force feedback device, said second processor being separate from said host computer and from said first processor;

determining open loop forces by said first processor to be output on said actuator based on at least one command sent from said host computer; and summing said open loop force sand said closed loop force by said second processor to a total force and outputting said total force using an actuator on said force feedback device controlled by said second processor, said force being felt by a user of said force feedback device.

10. A method as recited in claim 9 further comprising determining a velocity of said user manipulatable object from said sensor signal, and wherein said closed loop force is based at least one of said position and said velocity.

11. A method as recited in claim 10 wherein said second processor determines said open loop forces to be output on said actuator based on at least one command sent from said host computer.

12. A method a s recited in claim 10 wherein said second processor receives said sensor signal from said sensor and determines said position and said velocity of said user manipulatable object from said sensor signal.

13. A method as recited in claim 9 wherein said first processor receives a command from said host computer and said second processor receives parameters from said first processor to determine said closed loop force, said parameters derived from said command.

14. A force controller for providing force feedback using a force feedback interface device, said force controller coupled to said feedback interface device, wherein a host computer controls a display of a graphical environment on a display device, said host computer updating said graphical environment in response to user manipulation of said interface device and commanding force feedback sensations in response to said user manipulation and in coordination with events within said graphical environment, the force controller comprising:

a local microprocessor separate from said host computer and commanding forces to be output by an actuator of said interface device based on commands received from said host computer, said forces being felt by a user of said interface device; and a haptic accelerator coupled to and separate from said local microprocessor and said host computer, said haptic accelerator receiving sensor data from at least one sensor of said interface device and providing processed data from said sensor data, said processed data including position data representing a current position of a user manipulatable object of said interface device in at least one degree of freedom and velocity data representing a current velocity of said user manipulatable object in at least one degree of freedom, said position data being sent to said host computer to be used in updating said graphical environment, and wherein at least one of said position data and said velocity data is used in a determination of motion-based forces output to said actuator, wherein said haptic accelerator determines said motion-based forces based on at least one of said position data and said velocity data, said haptic accelerator outputting said motion-based forces to said actuator, wherein said local microprocessor determines open loop forces primarily based on time and sends said open loop forces to said actuator to be output, and wherein said open loop forces and said closed loop force are summed by said haptic accelerator to a total force to be output by said actuator.

15. A force controller as recited in claim 14 wherein said local microprocessor determines open loop forces primarily based on time and sends said open loop forces to said actuator to be output.

* * * * *